US012724887B2

(12) United States Patent
Huang

(10) Patent No.: US 12,724,887 B2
(45) Date of Patent: Sep. 1, 2026

(54) SYSTEMS AND METHODS FOR PREVENTING UNAUTHORIZED DATA ACCESS

(71) Applicant: Capital One Services, LLC, McLean, VA (US)

(72) Inventor: Anhui Huang, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 51 days.

(21) Appl. No.: 19/014,207

(22) Filed: Jan. 8, 2025

(65) Prior Publication Data

US 2026/0195448 A1 Jul. 9, 2026

(51) Int. Cl.
*G06F 21/55* (2013.01)
*G06F 21/62* (2013.01)
*G06F 40/30* (2020.01)

(52) U.S. Cl.
CPC ............ *G06F 21/554* (2013.01); *G06F 21/62* (2013.01); *G06F 40/30* (2020.01)

(58) Field of Classification Search
CPC ...... G06F 21/554; G06F 40/30; G06F 21/552; G06F 21/62
See application file for complete search history.

(56) References Cited

U.S. PATENT DOCUMENTS

2023/0376532 A1* 11/2023 McCarthy ............... G06F 16/84
2024/0045990 A1* 2/2024 Boyer ................. G06F 21/6245
2024/0419749 A1* 12/2024 Kallman ............. G06F 16/9537
2024/0427879 A1* 12/2024 Bulut .................... G06F 21/552
2025/0077487 A1* 3/2025 Groenewegen ....... G06F 16/215
2025/0328638 A1* 10/2025 Weinberger ........... G06F 21/604
2025/0348580 A1* 11/2025 Galinkin ............... G06F 40/284
2026/0073180 A1* 3/2026 Shobe .................... G06N 3/006
2026/0073185 A1* 3/2026 Shobe .................... G06N 3/042

FOREIGN PATENT DOCUMENTS

WO WO-2025171003 A1 * 8/2025 ............ G06F 40/30

* cited by examiner

*Primary Examiner* — Dao Q Ho

(74) *Attorney, Agent, or Firm* — Foley & Lardner LLP

(57) ABSTRACT

Methods and systems are described herein for preventing unauthorized data access based on an analysis of time series data. For example, a request to authorize a candidate event may be received. The request can indicate sequential event data representing a sequence of events to be retrieved. Discretized event data can be generated by assigning an encoding to each event indicating an assigned temporal bucket. The discretized event data can be input to an ensemble model, including one or more trained artificial intelligence models, to (i) generate natural language text representing the sequence, including additional context indicating semantic and contextual information associated with the events, (ii) generate an embedding representing the natural language text, (iii) determining an authorization score based on the embedding, and (iv) determining a classification result for the candidate event based on the authorization score.

20 Claims, 7 Drawing Sheets

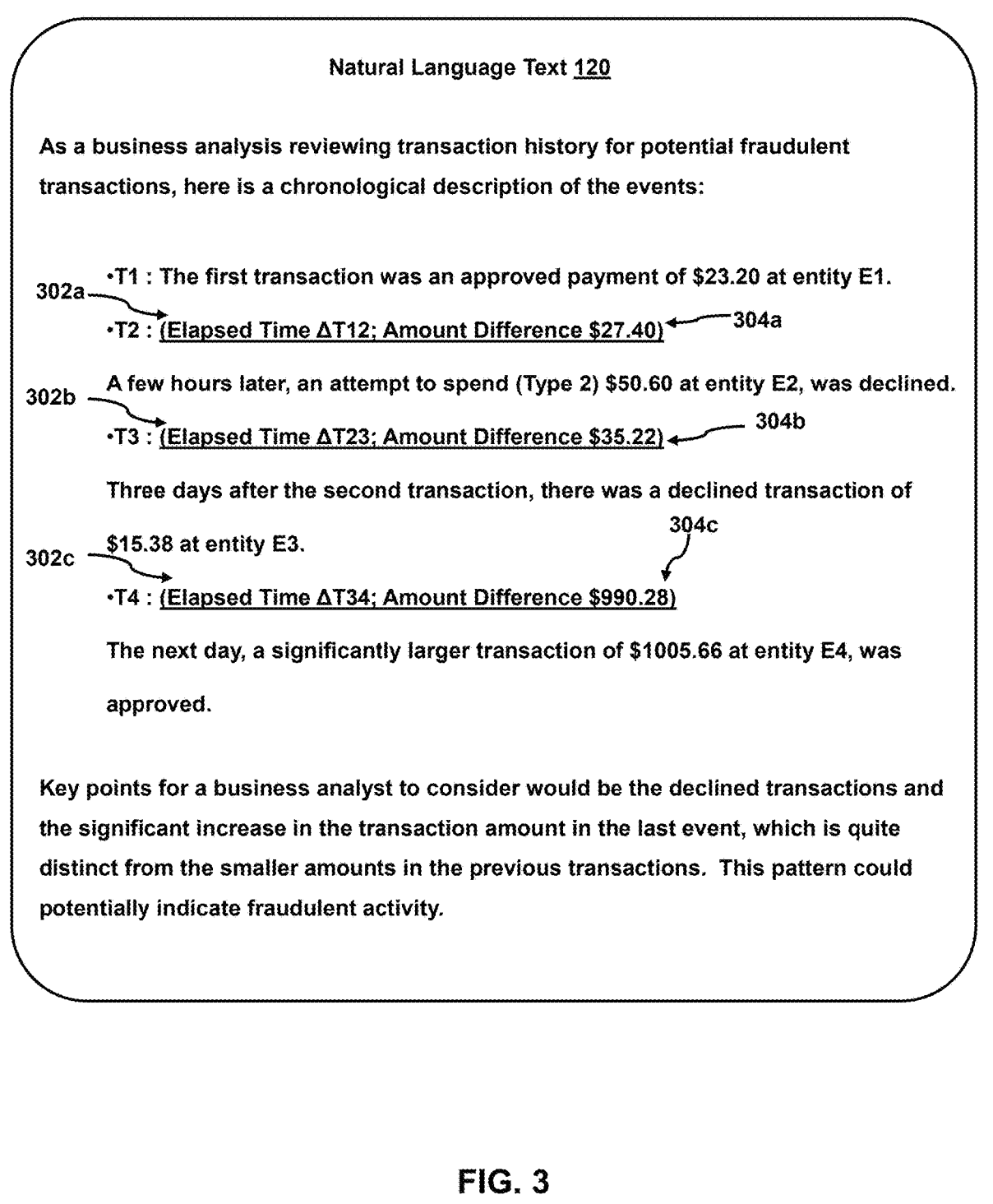

Natural Language Text 120

As a business analysis reviewing transaction history for potential fraudulent transactions, here is a chronological description of the events:

302a

•T1 : The first transaction was an approved payment of $23.20 at entity E1.

•T2 : (Elapsed Time ΔT12; Amount Difference $27.40)

304a

302b

A few hours later, an attempt to spend (Type 2) $50.60 at entity E2, was declined.

•T3 : (Elapsed Time ΔT23; Amount Difference $35.22)

304b

Three days after the second transaction, there was a declined transaction of $15.38 at entity E3.

304c

302c

•T4 : (Elapsed Time ΔT34; Amount Difference $990.28)

The next day, a significantly larger transaction of $1005.66 at entity E4, was approved.

Key points for a business analyst to consider would be the declined transactions and the significant increase in the transaction amount in the last event, which is quite distinct from the smaller amounts in the previous transactions. This pattern could potentially indicate fraudulent activity.

FIG. 3

SYSTEMS AND METHODS FOR PREVENTING UNAUTHORIZED DATA ACCESS

BACKGROUND

The challenges associated with ensuring data remains protected and secure is ongoing and increasing in complexity. As more and more users collect more and more data, preventing unauthorized access to that data becomes increasingly important.

SUMMARY

Methods and systems are described herein for novel uses and/or improvements to preventing unauthorized data access. As an example, these methods and systems provide improved techniques for detecting fraudulent events using sequential event data to preventing/reduce future occurrences of unauthorized data access.

Malicious actors are being increasing savvy, continually trying new techniques to fool existing fraud detection systems. This makes the challenges associated with correctly identifying unauthorized activities a recurring problem. For example, malicious actors will attempt to access data or perform actions with an authorized account using non-suspicious patterns or techniques. As an example, an entity that store a credit card number could try and make an outlandish purchase, which would almost certainly raise alarms, or could use a shrewder approach and make various small, innocuous, and/or local purchases, which would not raise suspicious to fraud detection systems due to these actions being considered “normal” (or more aptly, not abnormal). Therefore, the methods, systems, and programming described herein provide improved fraud detection systems that are able to reduce unauthorized data access. This helps prevent loss of property (digital property, physical property, financial assets, network resources, etc.) as well as reduces computational resources required to perform fine-grain investigations into prior events to source unauthorized data accesses that were not detected in time. Moreover, these techniques help ensure that secure, private, and protected data is not accessed, obtained, or modified by any unauthorized entity.

In some embodiments, systems, methods, and programming are provided for developing and deploying an artificial intelligence model or models that are able to identify unauthorized data access attempts and prevent those attempts from access protected data. The artificial intelligence model may be trained using various training processes. For example, the artificial intelligence model may be an ensemble model, including various models, such as a generative artificial intelligence model, a transformer model, a trained supervised learning model, a classifier model, or combinations thereof.

In some embodiments, a candidate event may be detected as a possible unauthorized data access attempt (e.g., a fraudulent credit card transaction). Based on the candidate event, other events occurring around the same time (e.g., within a few days of the candidate event) can be identified and data related to those events can be retrieved. This event may be time series data in that each data point corresponds to a point in time, and the events occur in a sequence. In some embodiments, to improve model accuracy in identifying unauthorized data access attempts, the event data can be discretized into temporal buckets. The temporal buckets allow the data to be analyzed contextually in relation to the candidate event. For example, the temporal buckets may group together all events detected within a certain amount of time of the candidate event (e.g., one bucket for events that occurred X−2 to X−1 days before the candidate event, one bucket for events that occurred X−1 to X days of the candidate event, and the like). Discretizing the events into temporal buckets allows the ensemble model to compare the patterns of events detected to those of other unauthorized data access attempts. The motivation behind this is that, for certain types of unauthorized data access, similar behaviors can occur. By discretizing the event data, these patterns are more clearly detected.

Upon discretizing the event data, a first AI model, such as a generative AI model, may be used to generate natural language text describing the discretized event data. The natural language text may be formatted as a prompt for input to another AI model, such as a large language model (LLM). In some embodiments, the generated natural language text can include additional context that provides contextual and semantic information describing the relationships between events. For example, if the natural language text includes a first description of a first credit card transaction and a second description of a second credit card transaction, then the additional context may include text describing differences and/or similarities between those transactions. For instance, the additional context can indicate a payment difference between the first transaction and the second transaction, an amount of time that elapsed between the events, a difference in location of the events, and the like.

The generated natural language text can be input to a second AI model, which may be a transformer model. In some embodiments, the transformer model can generate an embedding representing the generated natural language text. The embedding comprises a computer understandable representation of the natural language text. For example, the embedding may be a vector of floating-point numbers. In some cases, the embedding can be generated dynamically by leveraging the probabilities associated with each token from the natural language text. This can allow the embeddings to be slightly different during each run, thereby improving model accuracy.

The embeddings can be analyzed using a third AI model (e.g., a decoder portion of the transformer model) along with, in some cases, a fourth AI model (e.g., a classification layer of the transformer model) to generate a classification result. The third AI model can be trained to generate an authorization score, which indicates a likelihood that the candidate event in question is an unauthorized data access attempt. The score can be a numerical value (e.g., 0-1, 0-10, 0-100, etc.). The fourth AI model can determine a classification result using the authorization score. For example, the classification result can indicate whether the candidate event is to be authorized. If so, then the candidate event can be approved, and any data to be access, processed, modified, etc., or other actions, can occur. On the other hand, if the classification result indicates that the candidate event is not to be authorized, the data access attempt can be prevented.

In some aspects, methods and systems for preventing unauthorized data access based on an analysis of time series data are described. For example, the methods and systems may include receiving a request to authorize a candidate event. The methods and systems may also include retrieving, based on the request, sequential event data representing a sequence of events occurring within a predefined amount of time of the candidate event. In addition, the methods and systems may include assigning an encoding to each event of the sequence of events based on a timestamp of the event to obtain discretized event data. The methods and systems may further include generating, using a first trained artificial intelligence model, based on the discretized event data, (i) natural language text comprising updated temporal information indicating an amount of time that elapsed between each event of the sequence of events and (ii) an embedding representing the natural language text. The methods and systems may also include determining, using a second trained artificial intelligence model, based on the embedding, an authorization score representing a likelihood that each event of the sequence of events comprises an authorized event. In addition, the methods and systems may include generating, based on the authorization score, a classification result for the candidate event.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRA WINGS

FIG. 3 shows an illustrative diagram of an example prompt included model-produced annotations for input to a transformer model, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
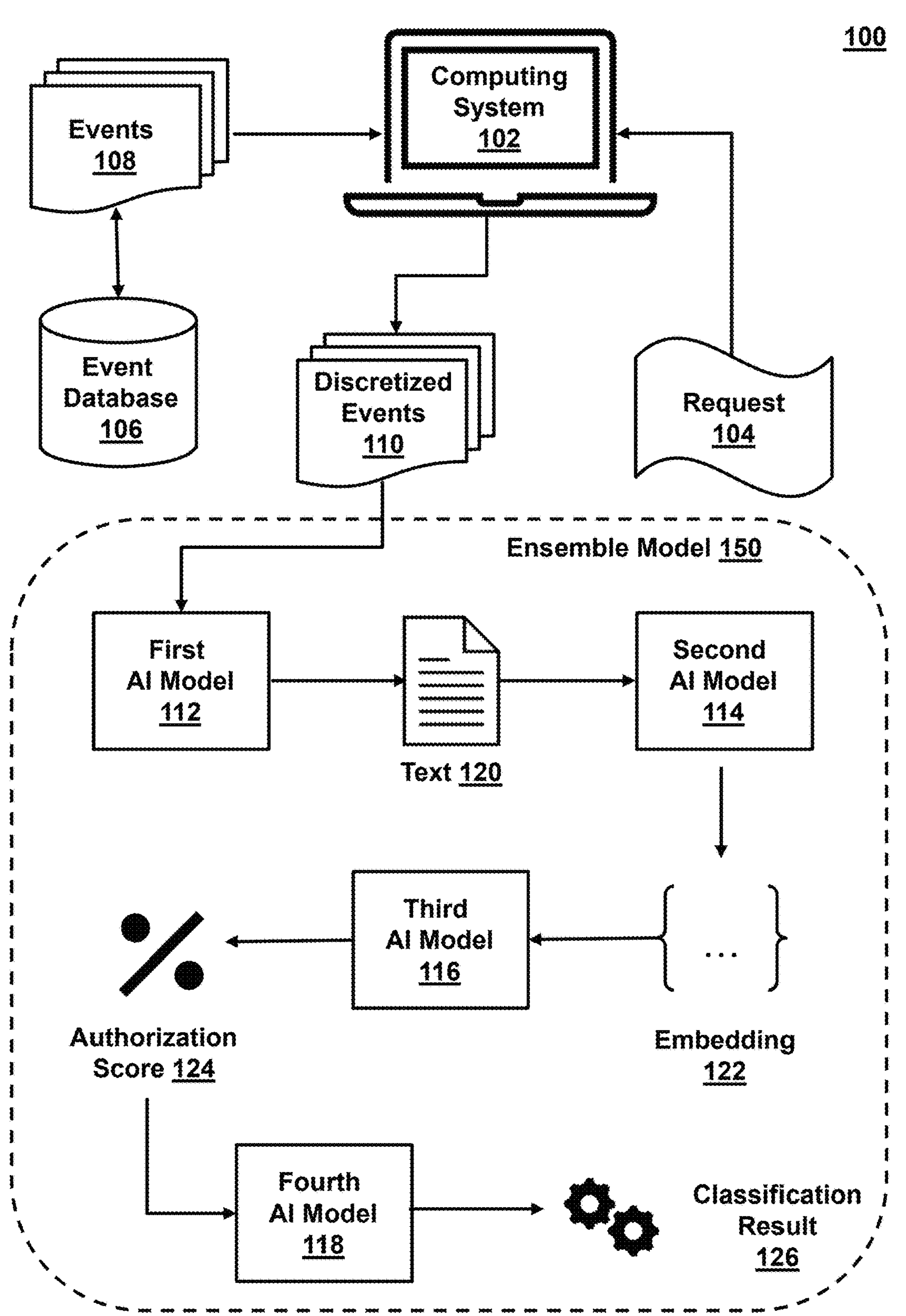
FIG. 1 shows an illustrative diagram of an example system for preventing unauthorized data access based on an analysis of time series data, in accordance with one or more embodiments.

FIG. 1 shows an illustrative diagram of a system 100 for preventing unauthorized data access based on an analysis of time series data, in accordance with one or more embodiments. For example, in response to receiving a request to authorize a candidate event, system 100 may generate a classification result. The classification result may indicate whether the candidate event is to be authorized. Events that are not authorized may refer to fraudulent events. Fraudulent events may include unauthorized users attempting to access one or more services, features, information, resources, or other aspects of an authorized user. As an example, a fraudulent event can include an unrequested or unauthorized data access request from an authorized account, such as an authorized account with a service provider. As another example, the fraudulent event may include a series of events that deviate from a pattern of events commonly associated with a given authorized account.

System 100, in some embodiments, may include a computing system 102. System 100 may also include one or more client devices, databases (e.g., an event database 106), servers, or other components. As an example, event database 106 may be a searchable database and may be accessed by some or all of the components of system 100. For example, event database 106 may be accessible by computing system 102. Event database 106 may store sequential event data, also referred to interchangeably as "event data," that represents one or more sequences of events 108. As described herein, a "sequence" refers to an ordered list. Events 108 may include events related to a particular authorized account with computing system 102. For example, computing system 102 may provide one or more services, resources, or other items, for use by one or more requesting devices. Alternatively, computing system 102 may access another computing system or server to use the services, resources, or other items.

Events 108 refer to data points associated with a particular authorized account. For example, if computing system 102 provides one or more social media networking services, then events 108 may refer to various interactions of a particular client with some or all of those social media networking services (e.g., opening of a social media application, dwell times, scrolling speeds, links accessed, etc.). Each of events 108 may occur at random or semi-random times and so the intervals of time between sequential events can vary. As another example, if system 102 provides one or more financial services, then events 108 may refer to various interactions of a particular client with those financial services (e.g., a credit card transaction, an ATM withdrawal, etc.). As yet another example, if computing system 102 provides one or more computing services, then events 108 may refer to various tasks or actions performed by those computing services (e.g., data transfers, model executions, database updates, blockchain actions, etc.).

In some embodiments, computing system 102 may retrieve event data including events 108 from event database 106 in response to receiving request 104. The event data may include temporal information indicating a time and/or a date each event occurred. The event data may be associated with a single user account or multiple user accounts. For example, a sequence of events can represent various computing activities, financial transactions, database updates, blockchain actions, or other tasks, associated with a particular authorized account. The event data may also include event information indicating one or more attributes of each sequence of events and/or events. Some example attributes can include a merchant type, an event name, a transaction amount, a status of the event, and/or the like. For example, the merchant type may indicate a business a transaction occurred, such as a retail store, an online retail store, a restaurant, and/or the like. The event name may indicate the type of event that occurred, for example, if a user purchased an item from an online retailer, the event type may be a transaction type, or if the user is disputing a previously made transaction, the event type may be a dispute type. The status of the event may indicate if a transaction has been completed, if a dispute has been rejected or approved, and/or the like. In some embodiments, system 100 may search a database (e.g., event database 106, etc.) for sequential event data associated with a sequence of events occurring within a predefined amount of time of an event (e.g., a candidate event, etc.). For example, the database may be searched for sequential event data associated with a sequence of events occurring either two days before or two days after the candidate event.

In some embodiments, computing system 102 may be configured to generate discretized event data including discretized events 110. Discretized events 110 may be generated by assigning events 108, which comprise time series data, into temporal buckets each associated with a time window. For example, computing system 102 may generate a set of temporal buckets. The temporal buckets may be associated with temporal windows. For example, the temporal buckets may include a first bucket and a second bucket, where the first bucket includes events occurring between a first time T1 and a second time T2, while the second bucket includes events occurring between second time T2 and a third time T3. Computing system 102 can attributed a temporal bucket encoding to each event indicating the temporal bucket with which the event was assigned.

Figure 2A:
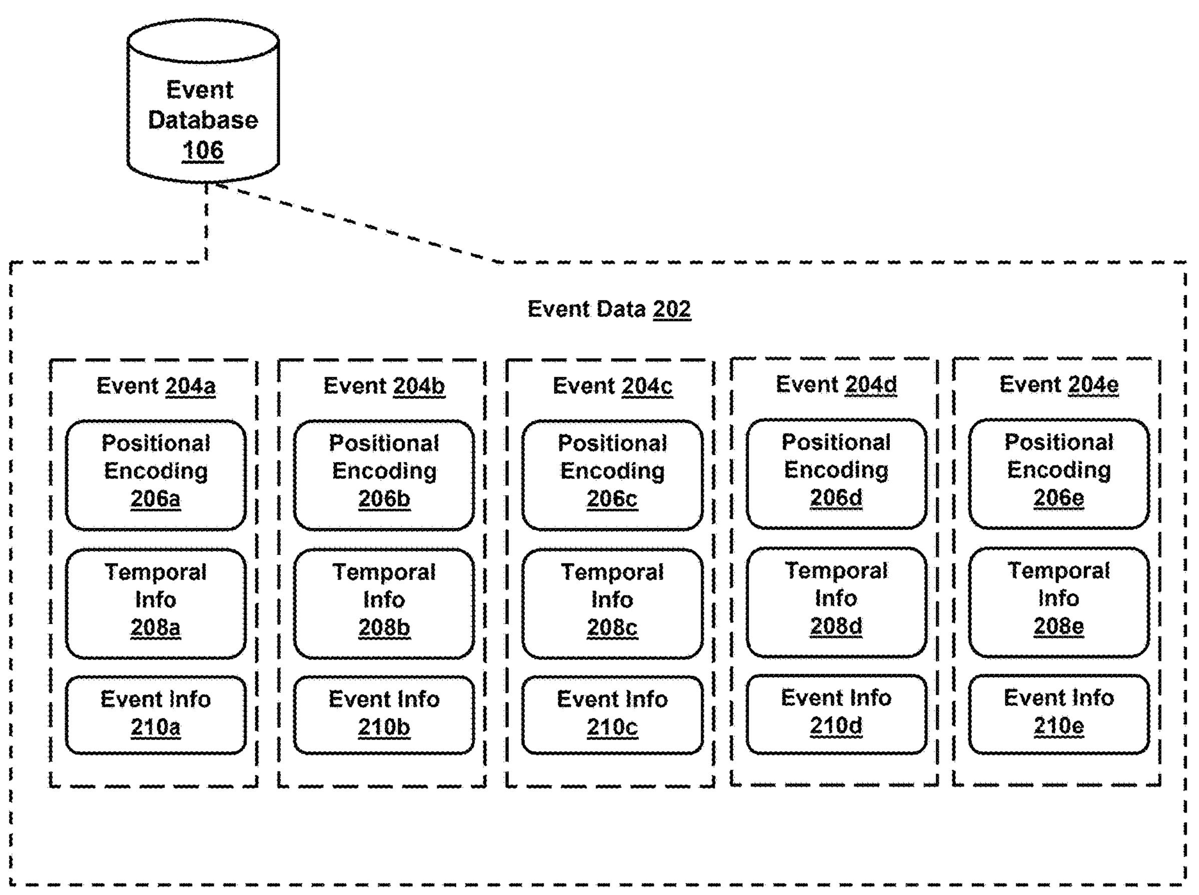
FIGS. 2A-2B shows an illustrative diagram of a process for encoding a sequence of events, in accordance with one or more embodiments.
Figure 2B:
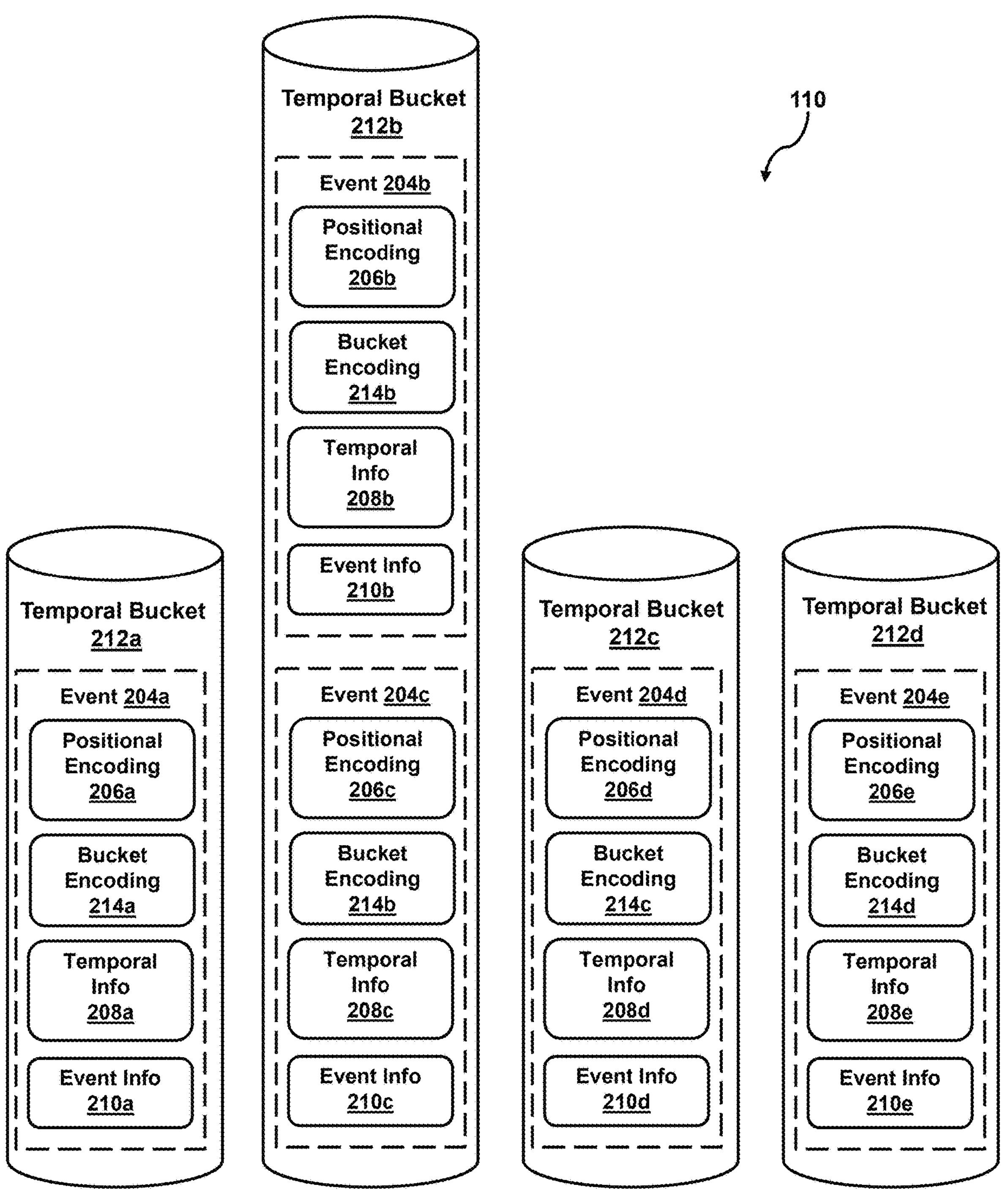

As an example, with reference to FIGS. 2A-2B, event data 202—also referred to herein interchangeably as "sequential event data"—can includes a sequence of events 204*a*-204*e*, which may be retrieved from a database (e.g., event database 106). In some embodiments, events 108 of FIG. 1 may include events 204*a*-204*e*. For example, event data 202 may be retrieved from event database 106 in response to receiving a request (e.g., request 104) to authorize a candidate event. In the examples shown in FIGS. 2A-2B, the candidate event can refer to event 204*c*. However, other events from event data 202 can serve as the candidate event, depending on the request. Furthermore, in some examples, multiple events can be selected as candidate events.

Each of events 204*a*-204*e* from event data 202 may include a positional encoding (e.g., positional encodings 206*a*-206*e*), temporal information (e.g., temporal information 208*a*-208*e*), event information (e.g., event information 210*a*-210*e*), or other information. Positional encodings 206*a*-206*e*, for example, can indicate a position of each of events 204*a*-204*e* within the sequence of events. For example, positional encoding 206*a* can indicate that, within this sequence of events, event 204*a* comes prior to event 204*b*; positional encoding 206*b* can indicate that event 204*b* comes prior to event 204*c*; positional encoding 206*c* can indicate that event 204*c* comes prior to event 204*d*; positional encoding 206*d* can indicate that event 204*d* comes prior to event 204*e*; and positional encoding 206*e* can indicate that event 204*e* comes subsequent to event 204*d*. In some embodiments, each of encodings 206*a*-206*e* can represent a unique character string defining the position of a corresponding event within the sequence. The unique character string, for example, can be randomly generated. In some embodiments, the positional encoding may comprise a hash of the event and its accompanying data (e.g., event information, temporal information, etc.).

Temporal information 208*a*-208*e* can indicate a date and/or time a corresponding event (e.g., events 204*a*-204*e*) occurred, was detected, and/or stored in the database (e.g., database 106). For example, temporal information 208*a* can indicate a time that event 204*a* occurred; temporal information 208*b* can indicate a time that event 204*b* occurred; temporal information 208*c* can indicate a time that event 204*c* occurred; temporal information 208*d* can indicate a time that event 204*d* occurred; and temporal information 208*e* can indicate a time that event 204*e* occurred. The temporal information can be stored as metadata appended to each event's data. In some embodiments, the temporal information may be immutable.

Event information 210*a*-210*e* can include attributes of associated with each corresponding event (e.g., events 204*a*-204*e*). For example, event information 210*a* may correspond to event 204*a*; event information 210*b* may correspond to event 204*b*; event information 210*c* may correspond to event 204*c*; event information 210*d* may correspond to event 204*d*; and event information 210*e* may correspond to event 204*e*. The attributes may include, for example, an event classification indicating a type of event that the event is associated. For example, the event may relate to a computing task, a blockchain operation, a financial transaction, a sensor measurement (e.g., pressure sensor, motion sensor, accelerometer, etc.), and the like, and the event classification can be determined based on the event type. The attributes can also indicate an entity or entities associated with the event. For example, the entity can refer to computing devices associated with a communication transmission, a merchant associated with a financial transaction, and the like. Attributes may also include an event name, a status of the event, for a financial transaction, a merchant type, a transaction amount, transaction location, or combinations thereof.

In some embodiments, events 204*a*-204*e* can be selected based on a candidate event. For example, and as mentioned above, event 204*c* may correspond to a candidate event (i.e., an event for which a request has been made to grant access to secure data), and events 204*a*, 204*b*, 204*d*, and 204*e* can be selected based on event 204*c*. In some embodiments, the candidate event can be indicated by the request (e.g., request 104 of FIG. 1). For example, request 104 may indicate that event 204*c* is a candidate event to evaluate for fraudulent, malicious, or other irregular features/behaviors. Therefore, the other events in the sequence of events (e.g., events 204*a-b*, 204*d*-204*e*) can be selected by computing system 102 when calling event database 106 to retrieve event data 202.

Candidate event 204*c* may correspond to a financial transaction whereby a user having a financial account with a financial service provider uses a financial service provider transaction card to transfer financial resources to an entity. For instance, the financial transaction can indicate a transaction amount (e.g., $32.00), a merchant associated with the transaction (e.g., a restaurant name, store number, etc.), a time and/or date of the transaction (e.g., May 23, 2022, at 1:05 PM EST), or other information. Attributes associated with the event can indicate whether a transaction card (e.g., credit card) was used to complete the transaction, whether the transaction is associated with a known profile of the user account, or other information. In some embodiments, candidate event 204*c* may be associated with a user account, such as a user account associated with a user of a user device and may include an interaction occurring at a first time. For example, the candidate event may be associated with a transaction occurring at 1:05 PM whereby a credit card owned by a user having a name "John Doe" was used.

In some embodiments, candidate event 204*c* can be detected by monitoring attributes and interactions associated with the user account. The monitoring features may be performed by computing system 102. Alternatively, computing system 102 may leverage one or more monitoring services to monitor events associated with one or more authorized accounts. For example, computing system 102 can monitor an activity of a credit card account associated with a particular authorized account. As an example, a candidate event can be detected when a credit amount of a particular transaction is greater than a threshold amount (which may be preset or configurable). As another example, a candidate event can be detected when a location of a transaction is more than a threshold distance from where transactions associated with the account typically occur.

As mentioned above, each event from sequence of events 204*a*-204*e* can include temporal information (e.g., temporal information 208*a*-208*e*) and event information (e.g., event information 210*a*-210*e*). Furthermore, as mentioned above, each event of sequence of events 204*a*-204*e* may include a positional encoding (e.g., positional encoding 206*a*-206*e*) indicating a position of an event within the sequence. In some embodiments, sequence of events 204*a*-204*e* may occur at non uniform temporal intervals as seen in the example given above. For instance, the sequential event data may comprise time series data. The time series data may include events (e.g., events 204*a*-204*e*), which may be separated by uniform or non-uniform temporal intervals. For example, in the case of financial transactions, the events may occur at random/semi-random times. Therefore, the amount of time between transactions can provide contextual information about the importance of a given event to another event. This is especially true when considering fraud detection, as fraudsters tend to make many purchases within a short amount of time.

In some embodiments, one or more of the events of the sequence of events may occur sequentially prior to or after candidate event 204*c*. For example, event 204*a* and event 204*b* may occur temporally prior to candidate event 204*c* while event 204*d* and event 204*e* occur temporally after candidate event 204*c*. In some embodiments, an amount of time between events may be the same or different. For example, the amount of time between event 204*a* and event 204*b* may be the same or different than the amount of time between event 204*b* and event 204*c*. As another example, the amount of time between event 204*a* and candidate event 204*c* may be the same or different than the amount of time between candidate event 204*c* and event 204*e*.

In some embodiments, sequence of events 204*a*-204*e* may include events occurring within a predefined amount of time (e.g., one or more minutes, one or more hours, one or more days, etc.) of candidate event 204*c*. For example, if the predefined amount of time is two days, then for a candidate event occurring on day X, the sequential event data may include data associated with any events detected within day X−2 to day X+2. The predefined amount of time may be select by a user (e.g., a user associated with an authorized account), a system administrator, or may be determined based on empirical data collected over time. The predefined amount of time may also be modeled and updated. In some embodiments, the predefined amount of time may be specified in the request. The predefined amount of time may also be predetermined.

In some embodiments, the sequential event data may include the N most recent events for a given candidate event (e.g., event 204*c*). For example, if N=10, the sequential event data may include the ten events that occurred closest in time to the candidate event. These events may include events that occurred prior to the candidate event (e.g., the last 10 events that occurred before the candidate event) after the candidate event (e.g., the next 10 events that occurred after the candidate event), or both prior to and after the candidate event (e.g., the most recent 10 events include 4 events that occurred prior to the candidate event and 6 events that occurred after the candidate event). The number of most recent events N may be predefined or dynamically configurable.

In some embodiments, the sequence of events may include the candidate event. For example, sequence of events 204*a*-204*e* includes candidate event 204*c*. In this example, event 204*a* and event 204*b* occur prior to candidate event 204*c* while event 204*d* and event 204*e* occur after candidate event 204*c*. However, some embodiments the sequence of events can exclude the candidate event.

In some embodiments, one or more amounts of elapsed time for each event of the sequence of events may be determined. For example, the elapsed time between the event 204*a* and the event 204*b* may be determined to be twenty-five hours and forty-eight minutes. Furthermore, the elapsed time between event 204*a* and event 204*b* may be the same or different from the elapsed time between event 204*d* and fourth event 204*e*.

In some embodiments, events 204*a*-204*e* can be discretized into one or more temporal buckets based on the temporal information associated with each event. As an example, with reference to FIG. 2B, each of events 204*a*-204*e* can be classified into one of temporal buckets 212*a*-212*d*. Each of temporal buckets 212*a*-212*d* represents a grouping of one or more events within a given sequence of events that occur between a first time and a second time. Temporal buckets 212*a*-212*d*, for each, may each correspond to a time period—for example, temporal bucket 212*a* may include events (e.g., event 204*a*) occurring between a time T1 and a time T2 (i.e., time window Δ12); temporal bucket 212*b* may include events (e.g., events 204*b*, 204*c*) occurring between time T2 and a time T3 (i.e., time window Δ23); temporal bucket 212*c* may include events (e.g., event 204*d*) occurring between time T3 and a time T4 (i.e., time window Δ34); and temporal bucket 212*d* may include events (e.g., event 204*e*) occurring between time T4 and a time T5 (i.e., time window Δ45). Each of the time windows (e.g., time windows Δ12-Δ45) may be equal and/or continuous.

In some embodiments, time windows Δ12-Δ45 may be defined based on the candidate event detected/being analyzed (e.g., event 204*c*). For example, time windows Δ12-Δ45 may be selected based on an occurrence of event 204*c*. This can allow time windows Δ12-Δ45 to be configured so as to capture suspicious events represented with unauthorized requests.

In some embodiments, computing system 102 may be configured to apply an encoding to each event of sequence of events 204*a*-204*e* based on the temporal bucket (e.g., temporal buckets 212*a*-212*d*) that those events were classified into. As an example, as seen in FIG. 2B, a temporal bucket encoding 214*a* can be applied to event 204*a* based on event 204*a* being assigned to temporal bucket 212*a*. Similarly, temporal bucket encoding 214*c* and temporal bucket encoding 214*d* can be applied to events 204*d* and 204*e*. A temporal bucket encoding 214*b* can be applied to events 204*b*-204*c* based on events 204*b*-204*c* being assigned to temporal bucket 212*b*. Encodings 214*a*-214*d* can be used by one or more artificial intelligence models to generate enhanced natural language text. This natural language text can include additional contextual information, based on the position encoding, temporal bucket encoding, temporal information, event information, etc., associated with the sequence of events. By including the additional contextual information, an enhance prompt can be formed, which can improve downstream results.

In some embodiments, computing system 102 can apply temporal bucket encodings 214*a*-214*d* may be based on positional encodings 206*a*-206*e*, temporal information 208*a*-208*e*, event information 210*a*-210*e*, or other information. Encoding 214*a*-214*d* may be generated, in some examples, by hashing some or all of the information included with each of events 214*a*-214*e*. In some embodiments, encodings 214*a*-214*d* may be generated using an encoding model or a mapping table. Each of encodings 214*a*-214*d* uniquely indicate a temporal bucket (e.g., temporal buckets 212*a*-212*d*) with which a corresponding event has been classified into.

Returning to FIG. 1, system 100 may include an ensemble model 150. In some embodiments, ensemble model 150 includes one or more trained artificial intelligence models. For example, ensemble model 150 may include a first AI model 112, a second AI model 114, a third AI model 116, and a fourth AI model 118. Additional models or fewer models may also be used by ensemble model 150, and the aforementioned is exemplary. AI models 112-118 may be the same or different type of model. For example, first AI model 112 may be a generative AI model, trained to generate natural language text (e.g., natural language text 120) based on discretized event data (e.g., discretized events 110); second AI model 114 may be a transformer model (e.g., an autoencoder) trained to generate embeddings (e.g., embedding 122) based on natural language text (e.g., natural language text 120); third AI model 116 may be a transformer model trained to generate authorization scores (e.g., an authorization score 124) based on embeddings (e.g., embedding 122); and fourth AI model 118 may be another transformer model (e.g., used for classification, a binary classifier, a multi-class classifier, etc.) trained to generate classification results (e.g., classification result 126) based on authorization scores 124.

In some embodiments, some of AI models 112-118 may be combined or may be integrated as part of a single model. For example, second AI model 114 and third AI model 116 may correspond to an encoder and decoder, respectively, of a transformer model having an encoder-decoder architecture. As another example, some of AI models 112-118 may exist external to ensemble model 150. For example, computing system 102 may access first AI model 112 hosted on a separate computing server. As another example, fourth AI model 118 may represent a classifier implemented locally by computing system 102 or a corresponding client device. Still further, in some embodiments, computing system 102 may implement ensemble model 150, storing the weights, biases, activation functions, thresholds, and other features for executing AI models 112-118. In some embodiments, ensemble model 150 may be housed on one or more cloud computing services that are access by computing system 102 upon request.

It should be noted that some or all of the components of system 100 may be implemented as part of a cloud-based computing platform configured to receive and process data from one or more external devices or sources (e.g., a user, etc.). Similarly, some or all of the components of system 100 may be integrated within a single device or distributed across multiple separate systems or devices. Further, some or all of the components of system 100 may be components of a computer workstation, a client device, or any other system or device that receives and process data from IoT or other data sources.

TABLE 1

| Event | Event Time | Entity ID | Event Type | Attribute | Status | Tag |
|---|---|---|---|---|---|---|
| E1 | T1 | Entity 1 | Type 1 | $23.20 | Approved | None |
| E2 | T2 | Entity 2 | Type 2 | $50.60 | Declined | Fraud Decline |
| E3 | T3 | Entity 3 | Type 3 | $15.38 | Declined | Fraud Decline |
| E4 | T4 | Entity 4 | Type 4 | $1005.66 | Approved | None |

As mentioned above, first AI model 112 may be trained to generate natural language text 120 based on discretized events data. An illustrative example of natural language text 120 is provided in FIG. 3. In particular, FIG. 3 illustrates natural language text 120 generated using the sample event data provided in Table 1 above. This sample event data may be discretized into temporal buckets, as described above with reference to FIGS. 2A-2B. The sample event data of Table 1 is presented for illustrative purposes. For example, while the sample event data of Table 1 relates to financial transactions, sample event data could alternatively relate to social media transactions, blockchain actions, database updates, computing tasks, and the like.

Table 1, in particular, includes four events: E1, E2, E3, and E4. Each event includes related data, such as, for example, an event time (e.g., times T1-T4), an entity identifier (e.g., Entity 1-4), an event type (e.g., Type 1-4), one or more attributes (e.g., transaction amount), a status (e.g., transaction approved/declined), a tag (e.g., fraud/no fraud), or other features, or combinations thereof. The event time may be stored at various levels of granularity. For example, the event time can be provided using a day, year, hour, minute, second, etc. Similarly, the attributes can be provided with various levels of granularity. For example, if the attribute refers to a transaction amount, the transaction amount can be provided using an approximate cost (e.g., approximately $20), or more exact (e.g., dollars, cents, etc.). As another example, if the attribute refers to a location, the location information can be provided with a GPS coordinate, a street address, a connected communications endpoint (e.g., router location), and the like.

Natural language text 120, as illustrated by FIG. 3, may be presented in the format of a prompt for an artificial intelligence model, such as a large language model (LLM). For example, natural language text 120 can be formatted to instruct an LLM to perform a particular task, specified by natural language text 120 (e.g., the prompt). Furthermore, natural language text 120 can include contextual information that can assist the LLM with performing the task. As an example, natural language text 120 can include sentences describing key aspects of each event from Table 1. The first bullet point corresponds to the first event (e.g., E1) associated with a first authorized account, which as seen from Table 1, and describes a transaction whereby a first transaction (e.g., a payment of $23.20) with a first entity (e.g., a retail store) that was approved. The second bullet point corresponds to the second event (e.g., E2) and describes an attempted transaction by the first authorized account with a second entity (e.g., an online service provider) for a second transaction (e.g., a payment of $50.60) that was declined. The third bullet point refers to the third event (e.g., E3) and describes another attempted transaction (e.g., a payment of $15.38) with a third entity (e.g., a restaurant) that was declined. The fourth bullet point refers to the fourth event (e.g., E4) and describes a transaction (e.g., a payment of $1005.66) with a fourth entity (e.g., a retail store) that was approved.

In some examples, each event may also include an initial tag indicating whether a corresponding event from the sequence was classified as being a fraudulent event. For example, as seen in FIG. 1, events E1 and E4 did not receive a fraud tag, as the transaction was approved (e.g., authorized). Events E2 and E3, on the other hand, did receive a fraud tag, and those transactions were declined (e.g., not authorized).

In some embodiments, first AI model 112 may be configured to generate additional contextual information beyond the information included in Table 1. For example, for each event, when possible, first AI model 112 may provide contextual information, such as temporal information 302*a*-302*c* and event information 304*a*-304*c*. Temporal information 302*a* can indicate, in natural language text, an amount of time that elapsed (e.g., 412) between the first event (e.g., E1) and the second event (e.g., E2); temporal information 302*b* can indicate an amount of time that elapsed (e.g., 423) between the second event (e.g., E2) and the third event (e.g., E3); and temporal information 302*c* can indicate an amount of time that elapsed (e.g., Δ34) between the third event (e.g., E3) and the fourth event (e.g., E4). As mentioned above, the amount of time can be provided at various levels of granularity. For example, Δ12, corresponding to the amount of time that elapsed between the first event (e.g., E1) and the second event (e.g., E2), can be presented in terms of days, hours, minutes, seconds, or finer details, depending on the requested granularity (e.g., from request 104 of FIG. 1), predefined granularity levels for first AI model 112, a granularity of times T1-T4 from Table 1, or other factors.

Event information 304*a*-304*c* can indicate, in natural language text, various other differences or similarities between attributes associated with the events, such as an amount difference between one transaction and a sequentially next transaction, a distance between a location of one transaction and a location of the sequentially next transaction, or other information. As an example, event information 304*a* can indicate a payment difference between a first event (e.g., E1) and a second event (e.g., E2); event information 304*b* can indicate a payment difference between the second event (e.g., E2) and a third event (e.g., E3); and event information 304*c* can indicate a payment difference between the third event (e.g., E3) and a fourth event (e.g., E4). As with temporal information 302*a*-304*c*, event information 304*a*-304*c* can also be provided with various levels of granularity, as specified by request 104, predefined by computing system 102, or determined based on the data included in Table 1. For example, the amount difference can be provided using various units of currency (e.g., dollars, cents).

Temporal information 302*a*-302*c* and event information 304*a*-304*c*, when included in natural language text 120 and used as input to second AI model 114 (e.g., an LLM), can provide improved encoding and downstream classification. This is especially useful when detecting fraudulent behavior. For example, when fraudsters procure authorized account data (e.g., an account number, a transaction card, etc.) of an authorized user, those fraudsters tend to perform a series of small transactions over a short period of time. As an example, fraudsters usually try to purchase items at various online and physical retailors and various geographical locations. This can maximize the fraudsters chances of successfully purchasing items before an event monitoring service (e.g., performed by computing system 102) is able to identify irregular behaviors of the authorized account, before a user associated with the authorized account notifies the event monitoring service of the unauthorized activities, or another action occurs. Therefore, the additional contextual information provided by temporal information 302*a*-302*c* and event information 304*a*-304*c* allows for second AI model 114 to better identify unauthorized events and prevent unauthorized access to services, features, resources, or other items of an authorized account. In particular, because of fraudsters tend to have similar behaviors, training first AI model 112 to generate natural language text including the additional contextual information allows for second AI model 114 to improve its ability to learn to identify which events to authorize or not authorize (e.g., which events are likely fraudulent events and necessitate further actions, such as contacting a user associated with the authorized account to confirm validity of the event). This technique, which expands short, non-natural language information, such as the sample event data presented in Table 1, into longer-form text (e.g., sentences, paragraphs, etc.) of natural language text that further provides contextual and semantic information, resulting in improved unauthorized access detection and prevention.

Figure 4:
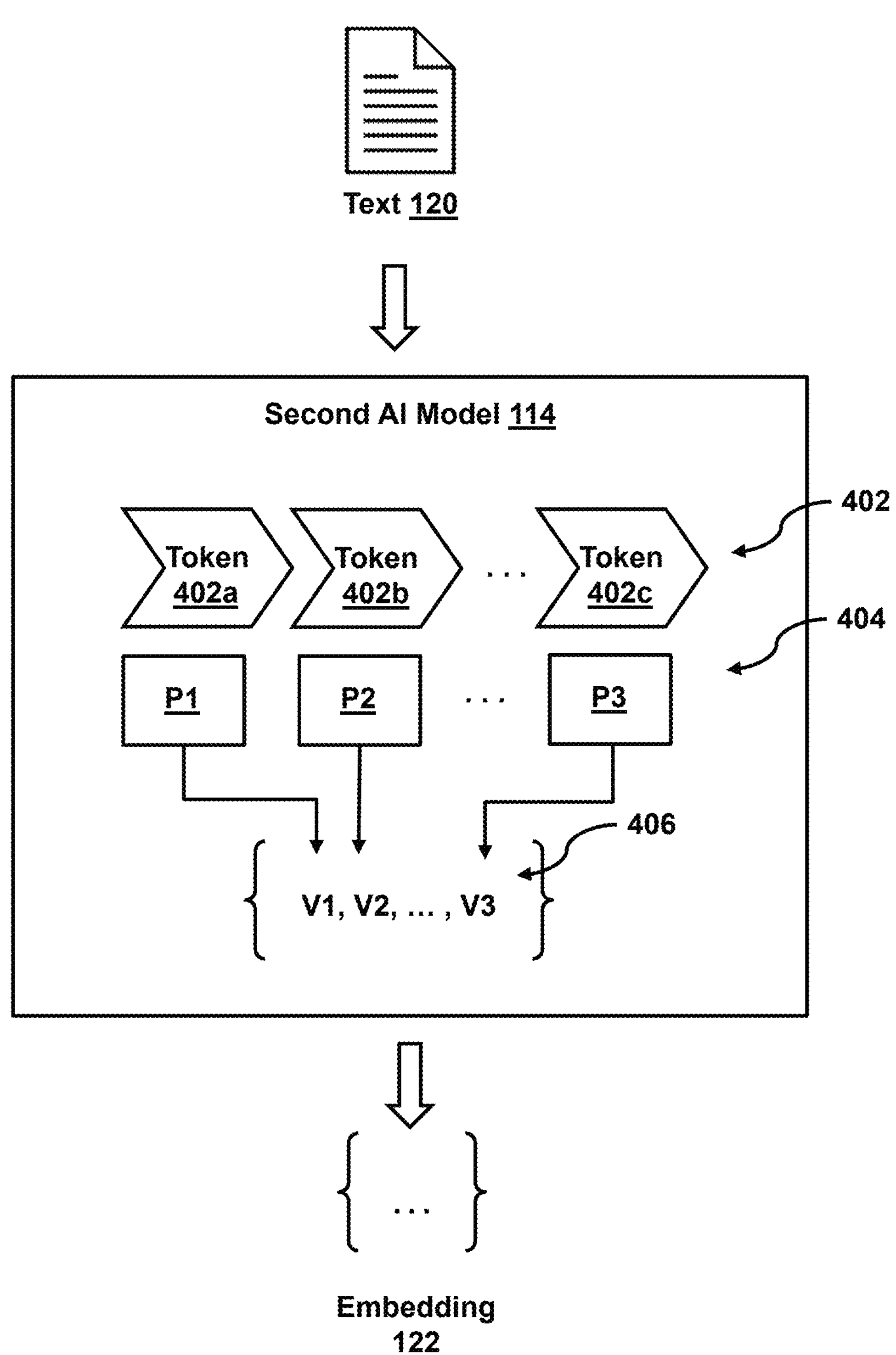
FIG. 4 shows an illustrative diagram of a process for generating embeddings based on natural language text leveraging probabilities associated with each text token, in accordance with one or more embodiments.

Returning to FIG. 1, second AI model 114, as mentioned above, may be trained to generate embedding 122 using natural language text 120. Embedding 122 refers to a computer-understandable representation of natural language text 120. An embedding is a continuous vector representation of a sequence, such as a sequence of text, a sequence of events (e.g., time series data), or other sequential data. For example, embedding 122 may be represented as a vector of floating-point numbers. Embeddings as representations for model input are particularly useful due to their ability to represent high-dimensional data in a low-dimensional space. To generate an embedding, and more particularly, a word embedding, text (e.g., natural language text 120) can be transformed into numerical representations of the text. As an example, with reference to FIG. 4, second AI model 114 (e.g., a transformer model) can receive an input sequence (e.g., natural language text 120) and can parse the input sequence to obtain a sequence of tokens 402*a*-402*c* (collectively referred to as tokens 402). Although three tokens 402*a*-402*c* are illustrated in FIG. 4, persons of ordinary skill in the art will recognize that this is for illustrative purposes, and sequence of tokens 402 can include one or more tokens, ten or more tokens, one hundred or more token, and the like. Tokens 402 represent a sequence of words or other semantic units, such as by using Byte Pair Encoding tokenization. Second AI model 114 can include or be coupled with a vocabulary of tokens. For example, tokens 402 can be represented as a one-hot encoding vector where each token of the vocabulary has a corresponding index in the encoding vector. Second AI model 114 can convert the input sequence into a modified input sequence. For example, the modified input sequence may be generated by applying an embedding matrix to the token tokens of the input sequence (e.g., using a neural network embedding function), and/or applying positional encoding (e.g., sin-cosine positional encoding) to the tokens of the input sequence. For simplicity, tokens 402 serve to represent the modified input sequence and the unmodified input sequence.

In some embodiments, second AI model 114 can process the modified input sequence (e.g., tokens 402) to determine a next token in the sequence (e.g., to append to the end of the sequence), such as by determining probability scores 404. Probability scores 404 can indicating the likelihood of a candidate token being the next token. In some examples, the next token can be selected based on probability scores 404 (e.g., selecting the candidate token having the highest probability scores as the next token). For example, second AI model 114 can apply various attention and/or transformer-based operations or networks to the modified input sequence to identify relationships between tokens for detecting the next token to form the output sequence. In some embodiments, probability scores 404 may include the output probabilities associated with the generation of each token of natural language text 120 via first AI model 112. For example, token 402*a* may have an associated probability P1, token 402*b* may have an associated probability P2, and token 402*c* may have an associated probability P3.

In some embodiments, second AI model 114 can generate values 406, which comprise numerical representations of tokens 402 taking probability scores 404 into account. For example, value V1 can be generated as a numerical representation of token 402*a* based on probability P1; value V2 can be generated as a numerical representation of token 402*b* based on probability P2; and value V3 can be generated as a numerical representation of token 402*c* based on probability P3. In some embodiments, values 406 can be selected dynamically based on probability scores 404. Embedding 122, which can be output by second AI model 114, can include values 406 representing tokens 402.

Returning to FIG. 1, embedding 122 can be provided as input to third AI model 116. Third AI model 116 may be trained to generate authorization score 124. Authorization score 124 can represent a likelihood of a candidate event (e.g., candidate event 204*c* of FIG. 2A) being a fraudulent event. In some embodiments, authorization score 124 may be a continuous value, such as a number between 0-1.0, 0-10, 0-100, or another value range. In some embodiments, authorization score 124 may comprise a classification or grouping. Third AI model 116 may, in some examples, comprise a decoder model. For example, second AI model 114 and third AI model 116 may be configured as an encoder-decoder of a transformer model. Third AI model may be configured to map embedding 122 to an authorization score (e.g., authorization score 124).

In some embodiments, authorization score 124 may be input to fourth AI model 118 to obtain a classification result 126. Classification result 126 may indicate whether the candidate event (e.g., candidate event 204*c*) is to be authorized. For example, classification result 126 may be a binary value (e.g., logical 0/1, True/False). In these examples, fourth AI model 118 may be a binary classifier, or may leverage the classifier head of a transformer model (e.g., a transformer model including second AI model 114, third AI model 116, fourth AI model 118. In some embodiments, classification result 126 may indicate a class of a set of classes that the candidate event is classified into. For example, fourth AI model 118 may comprise a multi-class classifier, configured to classify authorization scores into one of a set of classes. The set of classes may include any number of classes. For example, the set of classes may include an authorized class, a not authorized class, a verify class, or other class. In this example, the verify class corresponds to a class whereby an additional action is required to verify the candidate event before authorizing. For example, a candidate event classified into the verify class by fourth AI model 118 may cause a verification notification to be provided to a user associated with the authorized account with which the candidate event corresponds. A response to the verification notification can be used to update the classification result to authorized or not authorized. In some examples, a classification result remaining in the verify class may indicate that no response has been received to the verification notification.

In some embodiments, computing system 102 may be configured to store classification result 126 for each candidate event analyzed. In some embodiments, computing system 102 may be configured to store classification results for each event within the sequence. For example, as seen below the reference to Table 2, each of events E1-E4 may be attributed a fraud label (e.g., Good, Bad) based on classification result 126.

TABLE 2

| Event | Event Time | Entity ID | Event Type | Attribute | Status | Fraud Label |
|---|---|---|---|---|---|---|
| E1 | T1 | Entity 1 | Type 1 | $23.20 | Approved | Good |
| E2 | T2 | Entity 2 | Type 2 | $50.60 | Declined | Good |
| E3 | T3 | Entity 3 | Type 3 | $15.38 | Declined | Good |
| E4 | T4 | Entity 4 | Type 4 | $1005.66 | Approved | Bad |

In some embodiments, one or more events from Table 2 can be selected for improved data modeling techniques. For example, the selected rows can be treated as similar fraud transactions using techniques such as Synthetic Minority Oversampling Technique (SMOTE) for imbalanced classification tasks. One type of imbalanced classification task that SMOTE is advantageously useful for includes fraud analysis. In this process, data points that are determined to be similar to other data points (i.e., by more than a threshold amount) can be re-classified using inferred fraud labels. These re-classifications can adjust some of the determined labels to increase the number of samples in each class. For example, if the classes include a "Good" class and a "Bad" class, then the re-classifications can adjust some of the "Good" class classifications into "Bad" class classifications.

TABLE 3

| Event | Event Time | Entity ID | Event Type | Attribute | Status | Fraud Label | Inferred Fraud Label |
|---|---|---|---|---|---|---|---|
| E1 | T1 | Entity 1 | Type 1 | $23.20 | Approved | Good | Good |
| E2 | T2 | Entity 2 | Type 2 | $50.60 | Declined | Good | Bad |
| E3 | T3 | Entity 3 | Type 3 | $15.38 | Declined | Good | Bad |
| E4 | T4 | Entity 4 | Type 4 | $1005.66 | Approved | Bad | Bad |

As an example, with reference to Table 3, computing system 102 may be configured to compute a similarity score between each event's embedding to determine a similarity between the two events. For example, a cosine similarity can be computed between each event embedding classified into the "Good" class with each event embedding classified into the "Bad" class. As an illustrative example, event E3 may have an associated embedding U3 and event E4 may have an associated embedding U4. A similarity score indicating how similar event E2 is to event E4 can be computed (e.g., U2. U4=S24). If the similarity score (e.g., S24) is determined by computing system 102 to be greater than or equal to a threshold similarity score (e.g., 80% or greater, 90% or greater, 95% or greater, etc.), then this can indicate that event E2, which was initially applied with the fraud label "Good," indicating that it was classified into the "Good" class, can be updated to have an inferred fraud label of "Bad." This allows the population of sample events used when training ensemble model 150 to include a more balanced distribution of "Good" fraud labels and "Bad" fraud labels.

In some embodiments, ensemble model 150 can generate any of a variety of modalities of data, such as text, speech, audio, images, and/or video data. Each AI model included in ensemble model 150 (e.g., models 112-118) can include a plurality of nodes, which may be arranged in layers for providing the outputs of one or more nodes of one layer as inputs to one or more nodes of another layer. The model can include one or more input layers, one or more hidden layers, and one or more output layers. Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The AI models (e.g., AI models 112-118) can include, for example and without limitation, one or more large language models (LLMs), attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

The AI models (e.g., AI models 112-118) can include at least one diffusion model, which can be used to generate image and/or video data. For example, the diffusion model can include a denoising neural network and/or a denoising diffusion neural network. The denoising neural network can be configured by applying noise to one or more training data elements (e.g., images, video frames) to generate noised data, providing the noised data as input to a candidate denoising neural network, causing the candidate denoising neural network to modify the noise data according to a denoising schedule. The denoising diffusion neural network can then evaluate a convergence condition based on comparing the modified noised data with the training data instances and modify the candidate denoising neural network according to the convergence condition (e.g., modifying weights and/or biases of one or more layers of the neural network). In some implementations, the AI models can be trained separately or jointly to facilitate generating multimodal outputs, such as technical documents (e.g., service guides) that include both text and image/video information. In some cases, the AI models can be trained using adversarial training samples. For example, during each training iterations, the input data can be modified to include small inaccuracies, such as noise, incorrectly spelled words, or other data modifications.

In some embodiments, the AI models (e.g., AI models 112-118) can be configured using various unsupervised and/or supervised training operations. The AI models (e.g., AI models 112-118) can use training data from various domain-agnostic and/or domain-specific data sources. These data sources can store various types of data including, but not limited to, various forms of text, speech, audio, image, and/or video data, or various combinations thereof. The training data can include a plurality of training samples (e.g., training data instances). Each training sample can be arranged in structured. For example, the training sample can include an example output mapped to an example input, such as a query representing a service request, and a response representing data provided in response to the query. The training data can include one or more labels generated by a user training the AI models or generated by another AI model trained to generate labels. The labels can be used to provide the AI models with ground truth data to be utilized during the training process to allow ensemble model 150 including AI models 112-118 to generate more human-like outputs.

As mentioned above, first AI model 112 may include a generative AI model. This generative AI model can be trained using text training data including a plurality of training samples that each includes sample discretized event data and sample natural language text corresponding to the sample discretized event data. In some embodiments, the text training data may be generated by a manually or semi-manually generated based on sequential event data, The text training data may also, or alternatively, be generated by another AI model trained to generate text training samples.

In some embodiments, training first AI model 112 may include a series of steps for each text training sample of the plurality of text training samples. For example, for each text training sample, computing system 102 may provide the sample discretized event data to the model to obtain a constructed natural language text. First AI model 112 can use the constructed natural language text to compute a loss, using a loss function, compared to the sample natural language text (e.g., serving as reference feedback). First AI model 112 can subsequently update one or more model parameters of first AI model 112 based on the computed loss. In some embodiments, computing system 102 may repeat this process (e.g., construct natural language text, compute a loss, update model parameters) a predefined number of times or until a convergence condition has been satisfied (e.g., the model's accuracy exceeds a threshold accuracy and does not change after additional training iterations).

In some embodiments, first AI model 112 may be trained using adversarial training. For example, a discriminator may be included in ensemble model 150 or offline during a training portion of training first AI model 112. For example, computing system 102 may employ a BYOL self-supervised learning approach to improve the ability of first AI model 112 to generate realistic natural language text (e.g., natural language text). Persons of ordinary skill in the art will recognize that BYOL is merely exemplary, and other adversarial learning examples may be used instead of or in additional to BYOL.

As an illustrative example, the adversarial training process includes using two neural networks, such as two instances of first AI model 112 (prior to training or fine tuning). The first neural network can be referred to as the "online" neural network while the other neural network can be referred to as the "target" neural network. The online and target networks work together to learn from one another. Each of the online and target neural networks receive a version of the input data, in this example discretized event data. With BYOL training, an original sample can be augmented to generate two augmented samples which are provided in parallel to the online and target neural networks. This process tends to be useful when training vision transformers. In some cases, another adversarial training process may include using a discriminator. The discriminator can serve to try and determine whether the natural language text created by first AI model 112 (e.g., a generator) is real or if it is artificially created by another source (e.g., human source, a separate generative AI model). Through an iterative training process, first AI model 112 learns to distinguish between natural language text generated by the model and artificial natural language text. This improves the ability of first AI model 112 to generate natural language text 120 that is more realistic and is able to be used by other components of ensemble model 150 (e.g., second AI model 114, third AI model 116, fourth AI model 118) to improve its ability to classify events as being fraudulent or not fraudulent.

In some embodiment, AI models may include an encoder (e.g., feedforward encoder, convolutional encoder, etc.) trained using embedding training data prior to generating embedding 122. The embedding training data may include a plurality of embedding training samples, each embedding training sample of the plurality of embedding training samples may include sample natural language text and sample embeddings representing the sample natural language text. Training the encoder may include a series of steps for each of the plurality of embedding training samples. For example, for each of the plurality of embedding training samples, system 100 may provide the sample natural language text to the encoder to obtain a constructed embedding representing the natural language text, computing a loss function based on the constructed embedding and the sample embeddings, and update the one or more encoder parameters based on the loss function.

In some embodiments, second AI model 114 may be configured to determine the authorization score using authorization training data. For example, the authorization training data may include a plurality of authorization training samples, where each authorization sample of the plurality of authorization training samples includes a sample embedding representing a sample natural language text and a sample authorization score associated with the sample natural language text. System 100 can iteratively provide the sample natural language text to second AI model 114 to generate authorization scores which can then be compared against the sample authorization scores. A loss can be computed based on computed differences between the generated and sample authorization scores, which can be used to update model parameters of second AI model 114.

Figure 5:
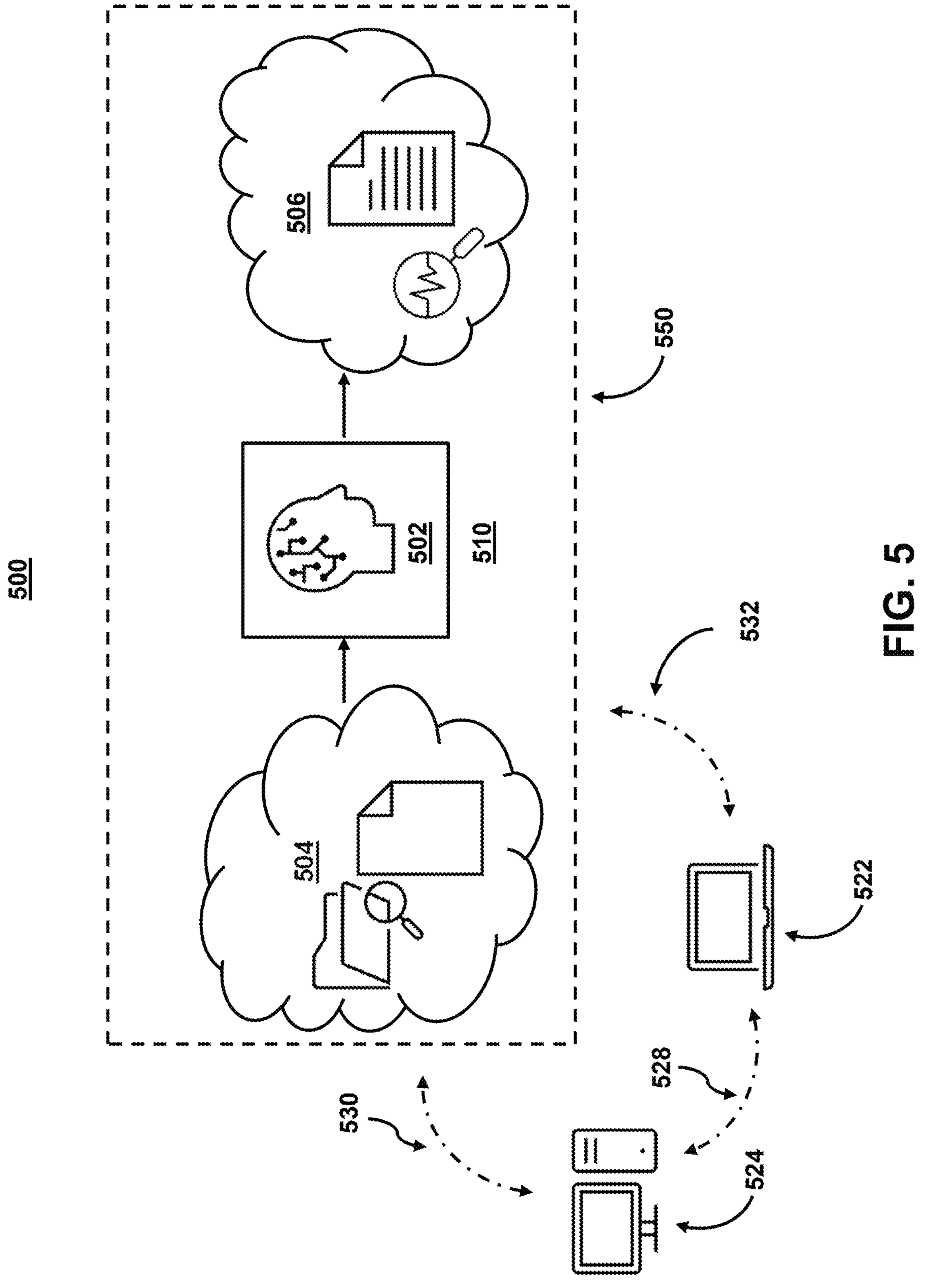
FIG. 5 shows illustrative components for a system used to prevent unauthorized data access based on an analysis of time series data, in accordance with one or more embodiments.

FIG. 5 shows illustrative components for a system 500 used to prevent unauthorized data access based on an analysis of time series data, in accordance with one or more embodiments. For example, FIG. 5 may show illustrative components for preventing fraudulent transactions based on historic credit card use. As shown in FIG. 5, system 500 may include mobile device 522 and user terminal 524. While shown as a smartphone and personal computer, respectively, in FIG. 5, it should be noted that mobile device 522 and user terminal 524 may be any computing device, including, but not limited to, a laptop computer, a tablet computer, a hand-held computer, and other computer equipment (e.g., a server), including “smart,” wireless, wearable, and/or mobile devices. FIG. 5 also includes cloud components 510. Cloud components 510 may alternatively be any computing device as described above, and may include any type of mobile terminal, fixed terminal, or other device. For example, cloud components 510 may be implemented as a cloud computing system and may feature one or more component devices. It should also be noted that system 500 is not limited to three devices. Users may, for instance, utilize one or more devices to interact with one another, one or more servers, or other components of system 500. It should be noted, that, while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally, or alternatively, multiple users may interact with system 500 and/or one or more components of system 500. For example, in one embodiment, a first user and a second user may interact with system 500 using two different components.

With respect to the components of mobile device 522, user terminal 524, and cloud components 510, each of these devices may receive content and data via input/output (hereinafter “I/O”) paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 5, both mobile device 522 and user terminal 524 include a display upon which to display data (e.g., conversational response, queries, and/or notifications).

Additionally, as mobile device 522 and user terminal 524 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice or data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may access a database (e.g., event database 106) and/or databases including sequential event data, previously generated natural language texts, previously generate embeddings, previously determined authorization scores, previously generated classification results, and user accounts associated with one or more candidate events.

Cloud components 510 may include a computing system (e.g., computing system 102 of FIG. 1) and/or one or more AI models (e.g., AI models 112-118 of ensemble model 150). For example, cloud components 510 may include a model 502, which may be a machine learning model, artificial intelligence model, etc. (which may be referred collectively as "models" herein), and may be the same as one or more of AI models 112-118 of ensemble model 150. Model 502 may take inputs 504 (e.g., discretized events 110, natural language text 120, embedding 122, authorization score 124, classification result 126, etc.) and provide outputs 506 (e.g., natural language text 120, embedding 122). The inputs may include multiple datasets, such as a training dataset, test datasets, validation datasets, or other information. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction to indicate if the candidate event or one or more events of the sequence of events is a fraudulent event.

As an illustrative example, model 502 may be the same or similar to first AI model 112, second AI model 114, third AI model 116 and/or fourth AI model 118. For example, third AI model 116 may have a similar architecture to that of model 502. In particular, third AI model 116 may receive embeddings 122 (e.g., inputs 504) and generate authorization score 124 (e.g., outputs 506). In some embodiments, third AI model 116 may output classification result 126 (e.g., outputs 506) instead of or in addition to authorization score 124.

In a variety of embodiments, model 502 may update its configurations (e.g., weights, biases, or other parameters) based on the assessment of its prediction (e.g., outputs 506) and reference feedback information (e.g., user indication of accuracy, reference labels, or other information). In a variety of embodiments, where model 502 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502 may be trained to generate better predictions.

In some embodiments, model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving, as compared to traditional computer programs. During training, an output layer of model 502 (which may be implemented via fourth AI model 118 of FIG. 1) may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, back propagation techniques may be utilized by model 502 where forward stimulation is used to reset weights on the "front" neural units. In some embodiments, stimulation and inhibition for model 502 may be more free flowing, with connections interacting in a more chaotic and complex fashion. During testing, an output layer of model 502 may indicate whether or not a given input corresponds to a classification of model 502 (e.g., an authorized event, an unauthorized event, etc.).

In some embodiments, the model (e.g., model 502) may automatically perform actions based on outputs 506. In some embodiments, the model (e.g., model 502) may not perform any actions. The output of the model (e.g., model 502) may be used to determine if the candidate event and/or one or more of the events of the sequence of events is an authorized event.

In some embodiments, third AI model 116, as mentioned above, may be trained to generate authorization score 124 and/or classification result 126 based on embedding 122. The training process to train third AI model 116 may include iteratively providing sample embeddings to the model. Each sample embedding may include a label or other indication of the authorization score or classification result known in advance for that sample embedding (if available for supervised learning). For each sample embedding, third AI model 116 can generate a predicted authorization score and/or predicted classification result. The predicted authorized score and/or predicted classification result can be compared to the known/predetermined authorization score/classification result to determine a loss. Third AI model 116 can update one or more model parameters (e.g., weights, biases, thresholds, etc.) based on the loss. This process can repeat, as mentioned above, iteratively. In some examples, this process can repeat a predefined number of times (e.g., 1,000 or more, 1,000,000 or more, etc.) or it can repeat until a convergence condition is met. For example, the convergence condition may be met if a difference between an accuracy of the model's prediction does not change by more than a threshold amount after a threshold number of iterations.

System 500 also includes API layer 550. API layer 550 may allow the system to generate summaries across different devices. In some embodiments, API layer 550 may be implemented on mobile device 522 or user terminal 524. Alternatively or additionally, API layer 550 may reside on one or more of cloud components 510. API layer 550 (which may be A REST or Web services API layer) may provide a decoupled interface to data and/or functionality of one or more applications. API layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 550 may use various architectural arrangements. For example, system 500 may be partially based on API layer 550, such that there is strong adoption of SOAP and RESTful Web-services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: Front-End Layer and Back-End Layer where microservices reside. In this kind of architecture, the role of the API layer 550 may provide integration between Front-End and Back-End. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open-source API Platforms and their modules. API layer 550 may use a developer portal. API layer 550 may use strong security constraints applying WAF and DDoS protection, and API layer 550 may use RESTful APIs as standard for external integration.

Figure 6:
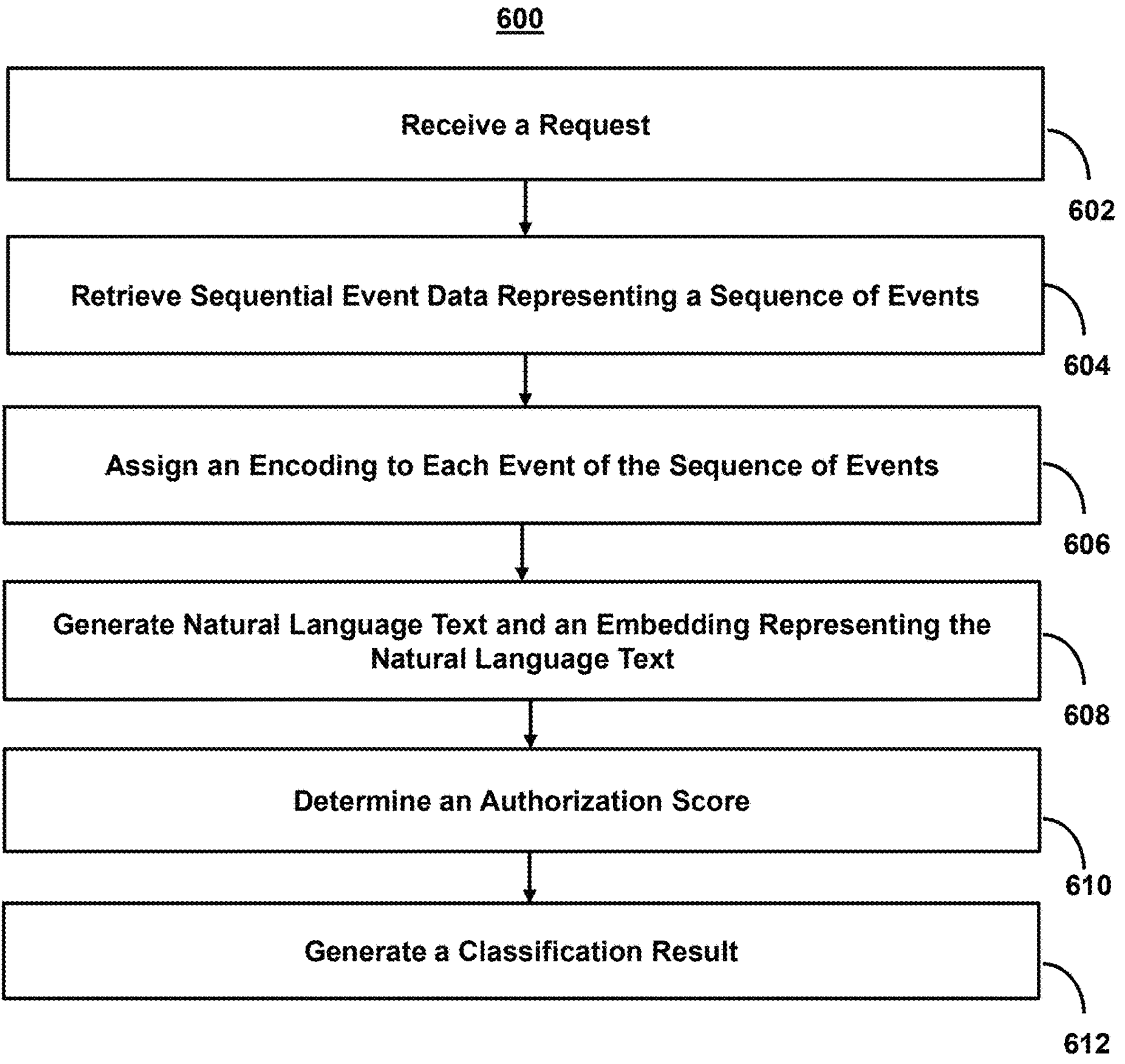
FIG. 6 shows a flowchart of the steps involved in preventing unauthorized data access based on an analysis of time series data, in accordance with one or more embodiments.

FIG. 6 shows a flowchart of the steps involved in preventing unauthorized data access based on an analysis of time series data, in accordance with one or more embodiments. For example, process 600 may be implemented using one or more computing systems, such as computing system 102 of FIG. 1, or other components described herein. In some embodiments, process 600 may begin at step 602.

At step 602, a request may be received. The received request may be to authorize a candidate event. For example, computing system 102 of FIG. 1 may receive request 104 to authorize a candidate event (e.g., candidate event 204*c* illustrated in FIG. 2A). In some embodiments, the request may be received from a user device. For example, the request may be received from a user having an authorized account with a service provider, where computing system 102 hosts one or more services (e.g., communications services, data processing services, financial services) accessible by a user via their user device. In some embodiments, the candidate event (as well as the request including or indicating the candidate event) may comprise temporal information, indicating a time the candidate event occurred, event information indicating attributes of the candidate event (e.g., a merchant type, an event name, a transaction amount, a status of the event, etc.), or other information. For example, as seen with respect to FIG. 2A, candidate event 204*c* may include temporal information 208*c* and event information 210*c*. Furthermore, the event may also include information associated with that event's position within the sequence of events. For example, event 204*c* (as well as the other events in sequence of events 204*a*-204*e*) may include a positional encoding (e.g., positional encoding 206*c*). The positional encoding can indicate a corresponding event's position within the sequence of events.

In some embodiments, as mentioned above, the request (e.g., request 104) may include the temporal information, event information, etc., associated with the candidate event (e.g., event 204*c*). The request may summarize the temporal information and the event information associated with the candidate event. The request may also detail one or more preferred computing tasks to be performed and/or not performed in response to the candidate being authorized and/or unauthorized.

In some embodiments, the candidate event (e.g., event 204*c*) may be associated with an authorized account associated with a user. The candidate event can, for example, represent an interaction occurring at a first time associated with that authorized account. For instance, the interaction may be an interaction between the user and an entity (e.g., another computing system or device, a merchant, etc.). For example, the transaction may correspond to a financial transaction, a computing transaction, a medical transaction, etc.

In some embodiments, computing system 102 may detect the candidate event by monitoring interactions associated with one or more authorized accounts, interactions associated with one or more computing devices, or other actions. For example, computing system 102 may offer or be in communication with a credit monitoring service configured to monitor credit card transactions associated with one or more credit card accounts. The monitoring may analyze various transactions to determine whether any are possible fraudulent, malicious, or otherwise unauthorized actions. In some examples, computing system 102 may detect the candidate event by receiving a request from a client device (e.g., a client device associated with the authorized account) to investigate the candidate event as being a potentially unauthorized event.

At step 604, process 600 (e.g. using one or more components described above) may retrieve sequential event data representing a sequence of events. For example, computing system 102 of FIG. 1 may retrieve, based on the request (e.g., request 104), sequential event data (e.g., event data 202 of FIG. 2A) representing a sequence of events (e.g., sequence of events 204*a*-204*e*) occurring within a predefined amount of time of the candidate event (e.g., candidate event 204*c*) from a database (e.g., event database 106). In some embodiments, the predefined amount of time may comprise various lengths of time. For example, the predefined amount of time may be selected prior to retrieving the sequential event data, and the predefined amount of time may comprise one day, three days, five days, seven days, ten days, or another amount of time.

The sequential event data may comprise temporal information (e.g., temporal information 208*a*-208*e*) indicating a time each event of the sequence of events occurred. The sequential event data may also include event information (e.g., event information 210*a*-210*e*) indicating attributes of each event of the sequence of events (e.g., a merchant type, an event name, a transaction amount, a status of the event, etc.). Retrieving the sequential event data allows the system to detect a series of fraudulent events. For example, if a fraudster has stolen a credit card, they may perform a series of test purchases with the stolen credit card. While one of these test purchases may go undetected if analyzing purchases individually, processing the sequential event data associated with the sequence of events surrounding an individual purchases may increase the likelihood of the series of test purchases being determined to be fraudulent.

The sequence of events may include a plurality of events (e.g., 103 or more events, 106 or more events, 109 or more events, or other quantities of events). The events can occur at uniform or non-uniform temporal intervals. For example, the events can refer to sensor measurements captured at a predefined sampling rate. As another example, the events can refer to transactions or interactions of a user with a service or service provider. In some embodiments, the sequential event data may be associated with an authorized account associated with the candidate event. For example, the candidate event may be one particular transaction on a user's credit card, and the sequential event data may be associated with events sequentially prior to the candidate event and/or occurring sequentially after the candidate event.

At step 606, process 600 (e.g., using one or more components described above) may assign an encoding to each event of the sequence of events. For example, computing system 102 may assign temporal bucket encodings 214*a*-214*d* to events 204*a*-204*e* based on temporal information 208*a*-208*e*. By assigning the temporal bucket encodings, computing system 102 is able to obtain discretized event data. For example, as seen in FIG. 1, computing system 102 can generate discretized events 110 based on events 108. The temporal bucket encodings can indicate which temporal bucket (e.g., temporal buckets 212*a*-212*d*) a particular event has been allocated. As an example, event 204*a* may be allocated to temporal bucket 212*a*; events 204*b* and 204*c* can both be allocated to temporal bucket 212*b*; event 204*d* can be allocated to temporal bucket 212*c*; and event 204*e* can be allocated to temporal bucket 212*d*. In some cases, the temporal buckets can be assigned events that occur within a particular time window (e.g., between time X1 and time X2). Assigning a temporal bucket encoding to each event of the sequence of events may allow the sequential event data to be processed more efficiently while maintaining the relationships between each event of the sequence of events event if the events occur irregularly. This additional step can enable quicker detection of fraudulent events/unauthorized access attempts, preventing malicious actions from occur with greater accuracy and frequency.

At step 608, natural language text and an embedding representing the natural language text may be generated. In some embodiments, the natural language text may be generated using a first AI model based on input discretized event data. For example, computing system 102 can provide discretized events 110 to first AI model 112 of ensemble model 150. First AI model 112 may be a generative AI model trained to generate text, such as natural language text 120, using discretized event data (e.g., discretized events 110). In some embodiments, first AI model 112 may be trained to generate natural language text in the form of a prompt for an LLM. This natural language text can include additional contextual information, based on the position encoding, temporal bucket encoding, temporal information, event information, etc., associated with the sequence of events. By including the additional contextual information, an enhance prompt can be formed, which can improve downstream results.

In some embodiments, the natural language text 120 may be input to another model, such as second AI model 114. Second AI model 114, in some embodiments, may be trained to generate an embedding (e.g., embedding 122) representing the natural language text. The embedding enables contextual and semantic information associated with discretized events 110, which is detailed in natural language text 120, to be understandable and processable by a computer. For example, the embedding can be used to classify an event as being authorized or unauthorized. In some embodiments, the embedding can be generated dynamically. For example, the probability associated with each token produced by first AI model 112 when generating natural language text 120 can be used by second AI model 114 to compute each token's corresponding numerical representation. This can enable second AI model 114 to generate unique embeddings for each natural language text even when the natural language text generated has some similarities.

In some embodiments, the first artificial intelligence model (e.g., first AI model 112) may comprise a generative artificial intelligence model which may be trained prior to generating the natural language text. For example, prior to generating natural language text 120, computing system 102 may train first AI model 112 using text training data. The text training data may comprise a plurality of text training samples. Each text training sample of the text training samples may include sample discretized event data and sample natural language text corresponding to the sample discretized event data. In some embodiments, one or more of the text training samples may be manually generated by a user based on sample sequential event data. The text training samples may alternatively or additionally be generated by another AI model (e.g., another generative AI model). For each text training sample, computing system 102 may provide the sample discretized event data to the generative artificial intelligence model to obtain constructed sample natural language text, compute a loss function (e.g., Mean squared error, mean absolute error, Huber loss, etc.) based on the constructed sample natural language text and the sample natural language text, and update one or more model parameters (e.g., weights, biases, etc.) of the generative artificial intelligence model based on the loss function.

In some embodiments, the second trained artificial intelligence model may comprise an encoder which may be trained using embedding training data. The second trained artificial intelligence model may comprise a transformer model having an encoder-decoder architecture. In these examples, second AI model 114 may represent the encoder portion, used to generate embeddings (e.g., embedding 122), and third AI model 116 may represent the decoder portion, used for authorization score generation. In some examples, fourth AI model 118 may represent a classification layer of the transformer model. Prior to generating the embedding (e.g., embedding 122), computing system 102 may train second AI model 114 (e.g., an encoder) using embedding training data. The embedding training data can include a plurality of embedding training samples, each including sample natural language text and a sample embedding representing the sample natural language text. In some embodiments, the embedding training data may be generated by another artificial intelligence model or encoder trained to generated embedding training data. In some embodiments, second AI model 114 may be a feedforward encoder, a convolutional encoder, or another encoder capable of generating the embedding representation of the natural language text.

In some embodiments, additional context may be generated to enhance the temporal information and/or event information. The additional context can be generated based on a value or value change associated with an attribute of one or more events. For example, the system may first determine a value of an attribute (e.g., a payment amount of a set of transactions, an engagement level with a mobile application or service over time, etc.) and may compute an attribute difference between the value of the attribute for the event and a value of the attribute for a sequentially previous and/or subsequent event. For example, a sequence of events of a user may include a first event of a payment of $22.00, a second event of a payment of $16.00, and a third event of a payment of $27.00. In this example, the difference in payment between the first event and the second is $6.00, and the difference between the second event and the third event is $11.00. Determining the first attribute difference and second attribute difference may allow the system to include this information in the natural language text thereby providing additional context for downstream analysis model (e.g., second AI model 114) to assist in determining whether to grant authorized access.

In some embodiments, generating the natural language text may comprise generating a first portion and a second portion of natural language text. For example, the system may first generate a first portion of natural language text corresponding to the updated temporal information and the generate a second portion of natural language text corresponding to the updated event information. Additional portions including additional attribute changes and/or similarities may be included. For example, the additional portions can indicate that the events occurred at a same location as a previous event. As another example, the additional attribute changes can indicate a change in location associated with the events.

In some embodiments, a text granularity level may be determined for the first trained artificial intelligence model. For example, the system may determine, based on the request, a text granularity level for the first trained artificial intelligence model, where the natural language text is generated based on the text granularity level. The text granularity can indicate an amount of detail to be provided in the generated natural language text. For example, first AI model 112 can be instructed to output natural language text 120 including the payment difference between two events in dollars, cents, euros, or other units of currency. As another example, first AI model 112 can be instructed to output natural language text 120 including elapsed times in terms of hours, minutes, seconds, milliseconds, or other units of measure.

At step 610, an authorization score may be determined. For example, third AI model 116 may be trained to receive an embedding (e.g., embedding 122) and determine an authorization score (e.g., authorization score 124) representing a likelihood that an event (e.g., candidate event **204*c***) is an authorized event. In some embodiments the authorization score may be a numerical value (e.g., a probability).

At step 612, classification result can be generated. For example, classification result 126 can be generated for the candidate event based on authorization score 124. The classification result may indicate that the candidate event (e.g., candidate event **204*c*) is an authorized event or an unauthorized event. Generating the classification result allows the system to indicate if an event is fraudulent and generating the authorization score may allow a user to understand how the system decided to mark an event as fraudulent. In some embodiments, steps 610 and 612 may be combined into a single step. In this example, third AI model 116 and fourth AI model 118** may be combined.

In some embodiments, third AI model 116 may be trained using authorization training data. The authorization training data can include a plurality of authorization training samples each including a sample embedding representing sample natural language text and a sample authorization score associated with the sample natural language text.

In some embodiments, computing system 102 may be configured to perform one or more actions, tasks, operations, and the like, based on the determined classification result (e.g., classification result 126). For example, computing system 102 may authorize the candidate event (e.g., candidate event **204*c*) based on the classification result produced. For example, computing system 102** may authorize the candidate event based on the classification result indicating that the candidate event is an authorized event. For example, if the candidate event is a credit card transaction, the system may allow the candidate event to be charge to the owner of the credit card.

In some embodiments, the system may execute a computing task. For example, the system may execute a computing task associated with the candidate event based on the candidate event being authorized. In some embodiments the system may prevent one or more computing tasks from being executed. For example, the system may prevent one or more computing tasks from being executed based on the classification result indicating that the candidate event is a non-authorized event. The computing task may comprise approving a transaction, declining a transaction, recording the transaction, notifying another user (e.g., an employee at the credit card company, etc.) of the transaction, or other computing tasks associated with completing a transaction. Allowing the system to prevent one or more computing task may prevent the fraudster from making more purchases with the stolen credit card and may also allow the system to notify a user that their credit card has been stole.

In some embodiments computing system 102 may generate updated training data to re-train at least a portion of ensemble model 150 (e.g., AI models 112-118). For example, computing system 102 may use the classification result (e.g., classification result 126) as a label for the candidate event (e.g., candidate event **204*c*). Computing system 102** may then generate a new training sample comprising event data associated with the candidate event and the label assigned to the classification result. Then the system may generate updated training data comprising the new training sample, wherein the updated training data is used to re-train at least one of the first trained artificial intelligence model or the second trained artificial intelligence model.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for preventing unauthorized data access based on an analysis of time series data.

2. The method of embodiment 1, comprising: receiving a request to authorize a candidate event; retrieving, based on the request, sequential event data representing a sequence of events occurring within a predefined amount of time of the candidate event; assigning an encoding to each event of the sequence of events based on a timestamp of the event to obtain discretized event data; generating, using a first trained artificial intelligence model, based on the discretized event data, (i) natural language text comprising updated temporal information indicating an amount of time that elapsed between each event of the sequence of events and (ii) an embedding representing the natural language text; determining, using a second trained artificial intelligence model, based on the embedding, an authorization score representing a likelihood that each event of the sequence of events comprises an authorized event; and generating, based on the authorization score, a classification result for the candidate event.

3. The method of embodiment 2, further comprising: authorizing the candidate event based on the classification result indicating that the candidate event is an authorized event.

4. The method of any one of embodiments 2-3, further comprising: executing a computing task associated with the candidate event based on the candidate event being authorized.

5. The method of any one of embodiments 2-4, further comprising: preventing one or more computing tasks from being executed based on the classification result indicating that the candidate event is a non-authorized event.

6. The method of any one of embodiments 2-5, wherein the first trained artificial intelligence model comprises a generative artificial intelligence model, the method further comprises: prior to generating the natural language text, training the generative artificial intelligence model using text training data to obtain the first trained artificial intelligence model, wherein the text training data comprises a plurality of text training samples, wherein each text training sample of the plurality of text training samples comprises sample discretized event data and sample natural language text corresponding to the sample discretized event data.

7. The method of embodiment 6, wherein training the generative artificial intelligence model comprises: for each text training sample of the plurality of text training samples: providing the sample discretized event data to the generative artificial intelligence model to obtain constructed sample natural language text; computing a loss function based on the constructed sample natural language text and the sample natural language text; and updating one or more model parameters of the generative artificial intelligence model based on the loss function.

8. The method of any one of embodiments 2-7, wherein the first trained artificial intelligence model comprises an encoder, the method further comprises: prior to generating the embedding, training the encoder using embedding training data comprising a plurality of embedding training samples to obtain the first trained artificial intelligence model, wherein each embedding training sample of the plurality of embedding training samples comprises sample natural language text and a sample embedding representing the sample natural language text.

9. The method of embodiment 8, wherein training the encoder comprises: for each embedding training sample of the plurality of embedding training samples: providing the sample natural language text to the encoder to obtain a constructed embedding representing the sample natural language text; computing a loss function based on the constructed embedding and the embedding training sample; and updating one or more model parameters of the encoder based on the loss function.

10. The method of any one of embodiments 2-9, wherein the sequential event data comprises first sequential event data representing a first sequence of events, the method further comprises: prior to determining the authorization score using the second trained artificial intelligence model, training an artificial intelligence model using authorization training data to obtain the second trained artificial intelligence model, wherein the authorization training data comprises a plurality of authorization training samples, wherein each authorization training sample of the plurality of authorization training samples comprises a sample embedding representing sample natural language text and a sample authorization score associated with the sample natural language text.

11. The method of any one of embodiments 2-10, further comprising: selecting the predefined amount of time prior to retrieving the sequential event data, wherein the predefined amount of time comprises: one day, three days, five days, seven days, or ten days.

12. The method of any one of embodiments 2-11, further comprising: determining, for each event of the sequence of events, based on a timestamp stored with each event indicating a time that the event occurred, (i) a first amount of time that elapsed between a sequentially previous event and the event and (ii) a second amount of time that elapsed between a sequentially subsequent event and the event to obtain the updated temporal information.

13. The method of any one of embodiments 2-12, further comprising: determining, for each event of the sequence of events, a value of an attribute of the event; computing a first attribute difference between the value of the attribute for the event and a first value of the attribute for a sequentially previous event; computing a second attribute difference between the value of the attribute for the event and a second value of the attribute for a sequentially subsequent event; and generating updated event information comprising the first attribute difference and the second attribute difference.

14. The method of embodiment 13, wherein generating the natural language text comprises: generating a first portion of natural language text corresponding to the updated temporal information; and generating a second portion of natural language text corresponding to the updated event information.

15. The method of any one of embodiments 2-14, wherein assigning the encoding comprises: for each event in the sequence of events, generating an updated event representation of the event encoding the timestamp of the event and a temporal bucket identifier of a temporal bucket of a set of temporal buckets for which the event is assigned.

16. The method of any one of embodiments 2-15, wherein the sequence of events comprises a plurality of events occurring at non-uniform temporal intervals.

17. The method of any one of embodiments 2-16, further comprising: determining, based on the request, a text granularity level for the first trained artificial intelligence model, wherein the natural language text is generated based on the text granularity level.

18. The method of any one of embodiments 2-17, wherein the natural language text comprises first natural language text comprising first updated temporal information and the embedding comprises a first embedding representing the first natural language text, the method further comprises: generating, using the first trained artificial intelligence model, based on the discretized event data, second natural language text comprising second updated temporal information; and generating, using the first trained artificial intelligence model, a second embedding representing the second natural language text, wherein the authorization score is determined based on the first embedding and the second embedding.

19. The method of any one of embodiments 2-18, further comprising: assigning a label to the classification result; generating a new training sample comprising event data associated with the candidate event and the label assigned to the classification result; and generating updated training data comprising the new training sample, wherein the updated training data is used to re-train at least one of the first trained artificial intelligence model or the second trained artificial intelligence model.

20. The method of any one of embodiments 2-19, wherein the sequential event data is retrieved responsive to receiving the request.

21. The method of any one of embodiments 2-20, wherein the first trained artificial intelligence model and the second trained artificial intelligence model are part of an ensemble model.

22. The method of embodiment 21, wherein the ensemble model includes a trained classifier configured to generate the classification result.

23. The method of embodiment 22, wherein the trained classifier comprises a binary classifier, wherein the classification result comprises a first result indicating that the candidate event is an authorized event or a second result indicating that the candidate event is an unauthorized event.

24. A method, comprising: responsive to receiving a request to authorize a candidate event, retrieving sequential event data representing a sequence of events occurring within a predefined amount of time of the candidate event; assigning an encoding to each event of the sequence of events based on a timestamp of the event to obtain discretized event data; generating, using an ensemble model, (i) natural language text comprising updated temporal information indicating an amount of time that elapsed between each event of the sequence of events based on the discretized event data, (ii) an embedding representing the natural language text, and (iii) an authorization score, determined based on the embedding, representing a likelihood that the event comprises an authorized event; and determining, based on the authorization score, a classification result for the candidate event.

25. A method, comprising: detecting a candidate unauthorized event associated with a user account, the candidate unauthorized event comprising an interaction occurring at a first time; responsive to receiving a request to authorize the interaction, retrieving sequential event data representing a sequence of events occurring within a predefined amount of time of the first time, wherein the sequential event data includes, for each event of the sequence of events, temporal information indicating a time the event occurred and event information indicating attributes of the event; for each event of the sequence of events, assigning a temporal bucket encoding to the sequential event data based on the time the event occurred to obtain discretized event data, the temporal bucket encoding indicating a temporal bucket of a set of temporal buckets to which the event is assigned; using a trained large language model (LLM): generating, based on the discretized event data, natural language text that describes each event from the sequence of events, and generating an embedding representing the natural language text, wherein the natural language text comprises updated temporal information indicating (a) an amount of time that elapsed between the event and a sequentially prior event or sequentially subsequent event and (b) updated event information indicating differences between the attributes of the event and prior event attributes of the sequentially prior event or subsequent event attributes of the sequentially subsequent event; determining, using a trained artificial intelligence model, based on the embedding, an authorization score representing a likelihood that the candidate unauthorized event comprises an authorized event; and generating, based on the authorization score, a classification result indicating the candidate unauthorized event is (i) an unauthorized event based on the authorization score being greater than or equal to a threshold authorization score or (ii) an authorized event based on the authorization score being less than the threshold authorization score.

26. One or more non-transitory, computer-readable mediums storing instructions that, when executed by a data processing apparatus, cause the data processing apparatus to perform operations comprising those of any of embodiments 1-25.

27. A system comprising one or more processors; and memory storing instructions that, when executed by the processors, cause the processors to effectuate operations comprising those of any of embodiments 1-25.

28. A system comprising means for performing any of embodiments 1-25.

What is claimed is:

1. A system for preventing unauthorized data access based on an analysis of time series data, the system comprising:

one or more processors programmed to:

detect a candidate unauthorized event associated with a user account, the candidate unauthorized event comprising an interaction occurring at a first time;

responsive to receiving a request to authorize the interaction, retrieve sequential event data representing a sequence of events occurring within a predefined amount of time of the first time, wherein the sequential event data includes, for each event of the sequence of events, temporal information indicating a time the event occurred and event information indicating attributes of the event;

for each event of the sequence of events, assign a temporal bucket encoding to the sequential event data based on the time the event occurred to obtain discretized event data, the temporal bucket encoding indicating a temporal bucket of a set of temporal buckets to which the event is assigned;

generate, using a trained large language model, based on the discretized event data, (i) natural language text that describes each event from the sequence of events, wherein the natural language text comprises updated temporal information indicating (a) an amount of time that elapsed between the event and a sequentially prior event or sequentially subsequent event and (b) updated event information indicating differences between the attributes of the event and prior event attributes of the sequentially prior event or subsequent event attributes of the sequentially subsequent event, (ii) an embedding representing the natural language text; (iii) second natural language text comprising second updated temporal information; and (iv) a second embedding representing the second natural language text;

determine, using a trained artificial intelligence model, based on the embedding, an authorization score representing a likelihood that the candidate unauthorized event comprises an authorized event; and execute, based on the authorization score, an action in connection with the request, wherein executing the action comprises:

authorizing the candidate unauthorized event based on a classification result derived from the authorization score and indicating that the candidate unauthorized event is an authorized event; or preventing one or more computing tasks from being executed based on the classification result indicating that the candidate unauthorized event is a non-authorized event.

2. A method, implemented using one or more processors of a computing system, comprising:

receiving a request to authorize a candidate event;

retrieving, based on the request, sequential event data representing a sequence of events occurring within a predefined amount of time of the candidate event;

for each event of a plurality of events of the sequence of events, assigning a temporal encoding to the sequential event data based on a timestamp of the event to obtain discretized event data;

generating, using a first trained artificial intelligence model, based on the discretized event data, (i) natural language text comprising (a) updated temporal information indicating an amount of time that elapsed between respective events of the sequence of events and (b) updated event information indicating differences between attributes of a respective event and attributes of a sequentially prior event or a sequentially subsequent event of the sequence of events; (ii) an embedding representing the natural language text; (iii) second natural language text comprising second updated temporal information; and (iv) a second embedding representing the second natural language text;

determining, using a second trained artificial intelligence model, based on the embedding and the second embedding, an authorization score representing a likelihood that each event of the sequence of events comprises an authorized event; and executing, based on the authorization score, an action in connection with the request, wherein executing the action comprises:

authorizing the candidate event based on a classification result derived from the authorization score and indicating that the candidate event is an authorized event; or preventing one or more computing tasks from being executed based on the classification result indicating that the candidate event is a non-authorized event.

3. The method of claim 2, wherein executing the action comprises authorizing the candidate event based on the classification result indicating that the candidate event is an authorized event.

4. The method of claim 2, wherein executing the action comprises preventing one or more computing tasks from being executed based on the classification result indicating that the candidate event is a non-authorized event.

5. The method of claim 2, wherein the first trained artificial intelligence model comprises a generative artificial intelligence model, the method further comprising:

prior to generating the natural language text and the second natural language text, training the generative artificial intelligence model using text training data to obtain the first trained artificial intelligence model, wherein the text training data comprises a plurality of text training samples, and wherein each text training sample of the plurality of text training samples comprises sample discretized event data and sample natural language text corresponding to the sample discretized event data.

6. The method of claim 5, wherein training the generative artificial intelligence model comprises:

for each text training sample of the plurality of text training samples:

providing the sample discretized event data to the generative artificial intelligence model to obtain constructed sample natural language text;

computing a loss function based on the constructed sample natural language text and the sample natural language text; and updating one or more model parameters of the generative artificial intelligence model based on the loss function.

7. The method of claim 2, wherein the first trained artificial intelligence model further comprises an encoder, the method further comprising:

prior to generating the embedding and the second embedding, training the encoder using embedding training data comprising a plurality of embedding training samples to obtain the first trained artificial intelligence model, wherein each embedding training sample of the plurality of embedding training samples comprises sample natural language text and a sample embedding representing the sample natural language text.

8. The method of claim 7, wherein training the encoder comprises:

for each embedding training sample of the plurality of embedding training samples:

providing the sample natural language text to the encoder to obtain a constructed embedding representing the sample natural language text;

computing a loss function based on the constructed embedding and the sample embedding; and updating one or more model parameters of the encoder based on the loss function.

9. The method of claim 2, wherein the sequential event data comprises first sequential event data representing a first sequence of events, the method further comprising:

prior to determining the authorization score using the second trained artificial intelligence model, training an artificial intelligence model using authorization training data to obtain the second trained artificial intelligence model, wherein the authorization training data comprises a plurality of authorization training samples, and wherein each authorization training sample of the plurality of authorization training samples comprises (i) a sample embedding representing sample natural language text, (ii) a second sample embedding representing second sample natural language text, and (iii) a sample authorization score associated with the sample natural language text and the second sample natural language text.

10. The method of claim 2, further comprising:

selecting the predefined amount of time prior to retrieving the sequential event data, wherein the predefined amount of time comprises one day, three days, five days, seven days, or ten days.

11. The method of claim 2, further comprising:

for each event of the plurality of events of the sequence of events, determining, based on a given timestamp stored with the event indicating a time that the event occurred, (i) a first amount of time that elapsed between a sequentially previous event and the event and (ii) a second amount of time that elapsed between a sequentially subsequent event and the event, wherein the updated temporal information is based on the first amount of time and the second amount of time.

12. The method of claim 2, further comprising:

for each event of the plurality of events of the sequence of events:

determining a value of an attribute of the event;

computing a first attribute difference between the value of the attribute for the event and a first value of the attribute for a sequentially prior event; and computing a second attribute difference between the value of the attribute for the event and a second value of the attribute for a sequentially subsequent event, wherein the updated event information is based on the first attribute difference and the second attribute difference.

13. The method of claim 2, wherein generating the natural language text comprises:

generating a first portion of the natural language text corresponding to the updated temporal information; and generating a second portion of the natural language text corresponding to the updated event information.

14. The method of claim 2, wherein assigning the temporal encoding comprises:

for each event in the sequence of events, generating an updated event representation encoding the timestamp of the event and a temporal bucket identifier of a temporal bucket, from a set of temporal buckets, to which the event is assigned.

15. The method of claim 2, wherein the sequence of events comprises events occurring at non-uniform temporal intervals.

16. The method of claim 2, further comprising:

determining, based on the request, a text granularity level for the first trained artificial intelligence model, wherein the natural language text or the second natural language text are generated based on the text granularity level.

17. The method of claim 2, further comprising:

assigning a label to the classification result;

generating a new training sample comprising event data associated with the candidate event and the label assigned to the classification result; and generating updated training data comprising the new training sample, wherein the updated training data is used to re-train at least one of the first trained artificial intelligence model or the second trained artificial intelligence model.

18. The method of claim 2, wherein assigning the temporal encoding to the sequential event data to obtain the discretized event data comprises assigning a temporal bucket encoding to the sequential event data based on the timestamp of the event to obtain the discretized event data, the temporal bucket encoding indicating a temporal bucket of a set of temporal buckets to which the event is assigned.

19. One or more non-transitory computer-readable media storing computer program instructions that, when executed by one or more processors, effectuate operations comprising:

receiving a request to authorize a candidate event;

retrieving, based on the request, sequential event data representing a sequence of events occurring within a predefined amount of time of the candidate event;

for each event of a plurality of events of the sequence of events, assigning a temporal encoding to the sequential event data based on a timestamp of the event to obtain discretized event data;

generating, using a first trained artificial intelligence model, based on the discretized event data, (i) natural language text comprising (a) updated temporal information indicating an amount of time that elapsed between respective events of the sequence of events and (b) updated event information indicating differences between attributes of a respective event and attributes of a sequentially prior event or a sequentially subsequent event of the sequence of events; (ii) an embedding representing the natural language text; (iii) second natural language text comprising second updated temporal information; and (iv) a second embedding representing the second natural language text;

determining, using a second trained artificial intelligence model, based on the embedding and the second embedding, an authorization score representing a likelihood that each event of the sequence of events comprises an authorized event; and executing, based on the authorization score, an action in connection with the request, wherein executing the action comprises:

authorizing the candidate event based on a classification result derived from the authorization score and indicating that the candidate event is an authorized event; or preventing one or more computing tasks from being executed based on the classification result indicating that the candidate event is a non-authorized event.

20. The one or more non-transitory computer-readable media of claim 19, wherein assigning the temporal encoding to the sequential event data to obtain the discretized event data comprises assigning a temporal bucket encoding to the sequential event data based on the timestamp of the event to obtain the discretized event data, the temporal bucket encoding indicating a temporal bucket of a set of temporal buckets to which the event is assigned.

* * * * *